United States Patent
Seo et al.

(10) Patent No.: US 11,398,878 B2
(45) Date of Patent: Jul. 26, 2022

(54) METHOD FOR TRANSMITTING OR RECEIVING SIGNAL IN WIRELESS COMMUNICATION SYSTEM AND APPARATUS THEREFOR

(71) Applicant: LG Electronics Inc., Seoul (KR)

(72) Inventors: Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 182 days.

(21) Appl. No.: 16/963,651

(22) PCT Filed: Jan. 18, 2019

(86) PCT No.: PCT/KR2019/000736
§ 371 (c)(1),
(2) Date: Jul. 21, 2020

(87) PCT Pub. No.: WO2019/143164
PCT Pub. Date: Jul. 25, 2019

(65) Prior Publication Data
US 2021/0067268 A1    Mar. 4, 2021

Related U.S. Application Data

(60) Provisional application No. 62/653,676, filed on Apr. 6, 2018, provisional application No. 62/640,508, filed (Continued)

(51) Int. Cl.
*H04W 72/04* (2009.01)
*H04W 74/00* (2009.01)
(Continued)

(52) U.S. Cl.
CPC ........ *H04L 1/0038* (2013.01); *H04L 25/0238* (2013.01); *H04W 4/40* (2018.02); *H04W 72/042* (2013.01); *H04W 72/0446* (2013.01)

(58) Field of Classification Search
None
See application file for complete search history.

(56) References Cited

U.S. PATENT DOCUMENTS 9,686,783 B1* 6/2017 Patel .................... H04L 5/0053
2010/0279628 A1* 11/2010 Love .................... H04L 5/0091
455/70

(Continued)

FOREIGN PATENT DOCUMENTS

WO    WO2015076619    5/2015

OTHER PUBLICATIONS

Extended European Search Report in European Appln. No. 19741909.6, dated Aug. 20, 2021, 9 pages.
(Continued)

*Primary Examiner* — Duc T Duong
(74) *Attorney, Agent, or Firm* — Fish & Richardson P.C.

(57) ABSTRACT

A method includes determining the number of CCEs for channel estimation and the number of times of blind-decoding related to multiple search space sets that the terminal needs to monitor during one slot, when the determined number of times of the blind-decoding exceeds a blind-decoding limit or the determined number of the CCEs exceeds a channel estimation limit, dropping at least one PDCCH candidate among PDCCH candidates in the multiple search space sets, and attempting to detect a PDCCH signal based on the remaining PDCCH candidates which have not been dropped. The terminal switches between the multiple search space sets in a round-robin scheme while dropping the PDCCH candidate until both the blind-decoding limit and the channel estimation limit are reached. The terminal is capable of communicating with at least one of another terminal, a terminal related to an autonomous driving vehicle, a base station or a network.

16 Claims, 10 Drawing Sheets

Related U.S. Application Data on Mar. 8, 2018, provisional application No. 62/634,672, filed on Feb. 23, 2018, provisional application No. 62/619,895, filed on Jan. 21, 2018.

(51) Int. Cl.

| | | |
|---|---|---|
| *H04L 1/00* | (2006.01) | |
| *H04W 4/40* | (2018.01) | |
| *H04L 25/02* | (2006.01) | |

(56) References Cited

U.S. PATENT DOCUMENTS

| | | | |
|---|---|---|---|
| 2013/0142142 A1* | 6/2013 | McBeath | H04W 72/042 |
| | | | 370/329 |
| 2014/0133367 A1* | 5/2014 | Chen | H04L 5/16 |
| | | | 370/279 |
| 2018/0227102 A1* | 8/2018 | John Wilson | H04L 5/0091 |
| 2019/0215098 A1* | 7/2019 | Tiirola | H04L 25/0238 |
| 2020/0351896 A1* | 11/2020 | Taherzadeh Boroujeni | |
| | | | H04L 5/0053 |
| 2021/0084620 A1* | 3/2021 | Tooher | H04W 72/042 |

OTHER PUBLICATIONS

LG Electronics, "Discussion on layer 1 enhancements for URLLC," R1-1810294, Presented at 3GPP TSG RAN WG1 Meeting #94bis, Chengdu, China, Oct. 8-12, 2018, 11 pages.

LG Electronics, "Remaining issues on search space," R1-1800372, Presented at 3GPP TSG RAN WG1 Meeting AH 1801, Vancouver, Canada, Jan. 22-26, 2018, 4 pages.

Huawei, HiSilicon, "UE procedure of PDCCH monitoring for URLLC," R1-1719405, 3GPP TSG RAN WG1 NR Meeting #91, Reno, USA, dated Nov. 27-Dec. 1, 2017, 4 pages.

PCT International Search Report and Written Opinion in International Application No. PCT/KR2019/000736, dated Apr. 9, 2019, 16 pages (with English translation).

Samsung, "PDCCH Design for URLLC," R1-1720325, 3GPP TSG RAN WG1 Meeting 91, Reno, USA, dated Nov. 27-Dec. 1, 2017, 4 pages.

Vivo, "Remaining details on NR-PDCCH search space," R1-1719781, 3GPP TSG RAN WG1 Meeting 91, Reno, USA, dated Nov. 27-Dec. 1, 2017, 7 pages.

ZTE, Sanechips, "NR PDCCH search space and number of BDs/CCEs per slot," R1-1721054, 3GPP TSG RAN WG1 Meeting #91, Reno, USA, dated Nov. 27-Dec. 1, 2017, 5 pages.

\* cited by examiner

FIG. 4
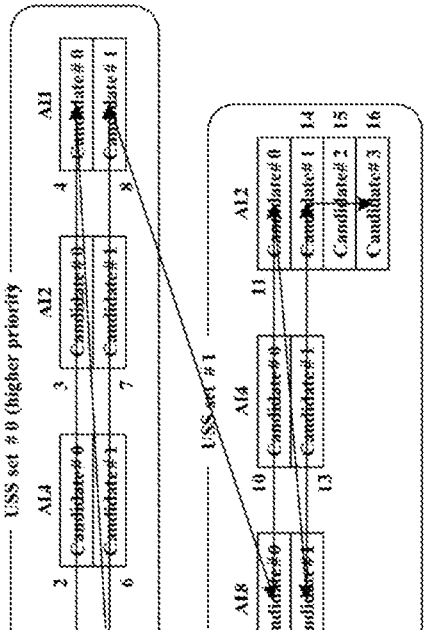
(b) round robin based on AL and candidate index
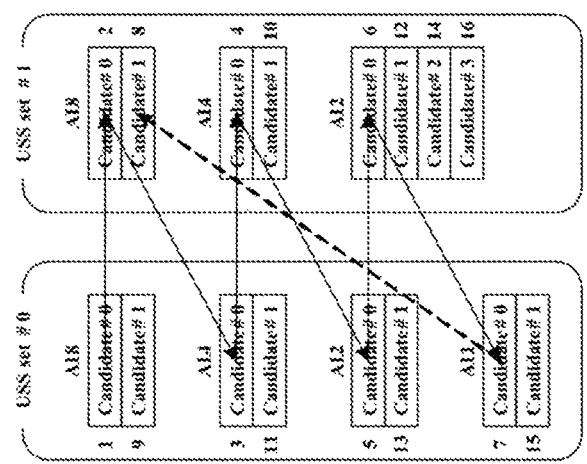
(a) round robin based on SS set index, AL, and candidate index

METHOD FOR TRANSMITTING OR RECEIVING SIGNAL IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2019/000736, filed on Jan. 18, 2019, which claims the benefit of U.S. Provisional Application No. 62/653,676, filed on Apr. 6, 2018, U.S. Provisional Application No. 62/640,508, filed on Mar. 8, 2018, U.S. Provisional Application No. 62/634,672, filed on Feb. 23, 2018, and U.S. Provisional Application No. 62/619,895, filed on Jan. 21, 2018. The disclosures of the prior applications are incorporated by reference in their entirety.

TECHNICAL FIELD

The present disclosure relates to a wireless communication system, and more particularly, to a method of transmitting or receiving a downlink control channel signal by a base station (BS) or user equipment (UE) in a wireless communication system, and an apparatus for performing the method.

BACKGROUND ART

First, the existing $3^{rd}$ generation partnership project (3GPP) long term evolution/long term evolution-advanced (LTE/LTE-A) system will be briefly described. Referring to FIG. 1, a user equipment (UE) performs an initial cell search (S101). In the initial cell search process, the UE receives a primary synchronization channel (P-SCH) and a secondary synchronization channel (S-SCH) from a base station, performs downlink synchronization with a base station (BS), and acquires information such as a cell identifier (ID). Thereafter, the UE acquires system information (e.g., MIB) through a physical broadcast channel (PBCH). The UE may receive a downlink reference signal (DL RS) and check the downlink channel status.

After the initial cell search, the UE may acquire more detailed system information (e.g., SIBs) by receiving a physical downlink control channel (PDCCH) and a physical downlink control channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE may perform PDCCH/PDSCH reception (S107) and physical uplink shared channel (PUSCH)/physical uplink control channel (PUCCH) transmission (S108) as a general uplink/downlink signal transmission procedure. The UE may transmit uplink control information (UCI) to the BS. The UCI may include hybrid automatic repeat request (HARM) acknowledgment/negative acknowledgment (ACK/NACK), scheduling request (SR), channel quality indicator (CQI), precoding matrix indicator (PMI) and/or rank indication (RI) etc.

DISCLOSURE

Technical Problem

An aspect of the present disclosure is to provide a method of more efficiently and accurately transmitting and receiving a physical downlink control channel (PDCCH) signal between a user equipment (UE) and a base station (BS), and an apparatus for performing the method.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of receiving a physical downlink control channel (PDCCH) signal by a user equipment (UE) in a wireless communication system includes determining the number of blind decodings and the number of control channel elements (CCEs) for channel estimation, related to a plurality of search space sets to be monitored during one slot by the UE, dropping at least one of PDCCH candidates included in the plurality of search space sets, when the determined number of blind decodings exceeds a blind decoding limit or the determined number of CCEs exceeds a channel estimation limit, and attempting to detect a PDCCH signal based on remaining non-dropped PDCCH candidates among the PDCCH candidates. The UE may drop the at least one PDCCH candidate from the plurality of search space sets in a round-robin manner until both the blind decoding limit and the channel estimation limit are satisfied.

In another aspect of the present disclosure, a method of transmitting a PDCCH signal by a BS in a wireless communication system includes determining the number of blind decodings and the number of CCEs for channel estimation, related to a plurality of search space sets to be monitored during one slot by a UE, dropping at least one of PDCCH candidates included in the plurality of search space sets, when the determined number of blind decodings exceeds a blind decoding limit or the determined number of CCEs exceeds a channel estimation limit, and transmitting a PDCCH signal based on remaining PDCCH non-dropped candidates among the PDCCH candidates. The BS may drop the at least one PDCCH candidate from the plurality of search space sets in a round-robin manner until both the blind decoding limit and the channel estimation limit are satisfied.

In another aspect of the present disclosure, a UE for receiving a PDCCH signal in a wireless communication system includes a transceiver, and a processor configured to determine the number of blind decodings and the number of CCEs for channel estimation, related to a plurality of search space sets to be monitored during one slot by the UE, drop at least one of PDCCH candidates included in the plurality of search space sets, when the determined number of blind decodings exceeds a blind decoding limit or the determined number of CCEs exceeds a channel estimation limit, and attempt to detect a PDCCH signal based on remaining non-dropped PDCCH candidates among the PDCCH candidates. The processor may be configured to drop the at least one PDCCH candidate from the plurality of search space sets in a round-robin manner until both the blind decoding limit and the channel estimation limit are satisfied.

The UE may drop a PDCCH candidate in a descending order of aggregation levels in each search space set.

The search space set may satisfy a nested structure in which a PDCCH candidate is included in a PDCCH candidate of a higher aggregation level than an aggregation level of the PDCCH candidate.

Each search space set may include a default PDCCH candidate which is not allowed to be dropped, and the UE may determine the default PDCCH based on at least one of a PDCCH candidate index or a UE identifier (ID).

The UE may attempt to detect both a PDCCH signal in a first cell and a PDCCH signal in a second cell in the same search space set.

PDCCH candidates in the first cell may be paired with PDCCH candidates in the second cell in the same search space set, and the UE may determine whether to drop PDCCH candidates on a pair basis.

The UE may determine which one of the PDCCH candidate in the first cell and the PDCCH candidate in the second cell is to be dropped based on cell indexes in the same search space set.

Advantageous Effects

According to an embodiment of the present disclosure, when a UE configured with a plurality of search space sets is not capable of monitoring all PDCCH candidates, the UE drops PDCCH candidates not on a search space set basis but on an individual PDCCH candidate basis. Therefore, the performance of the UE may be used as much as possible and scheduling flexibility of a network may be guaranteed. Further, since PDCCH candidates are dropped from search space sets in a round-robin manner, the problem that a whole specific search space set is not used may be overcome.

It will be appreciated by persons skilled in the art that the effects that may be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 4 is a diagram illustrating a method of selecting a candidate according to an embodiment of the present disclosure.

BEST MODE

Figure 1:
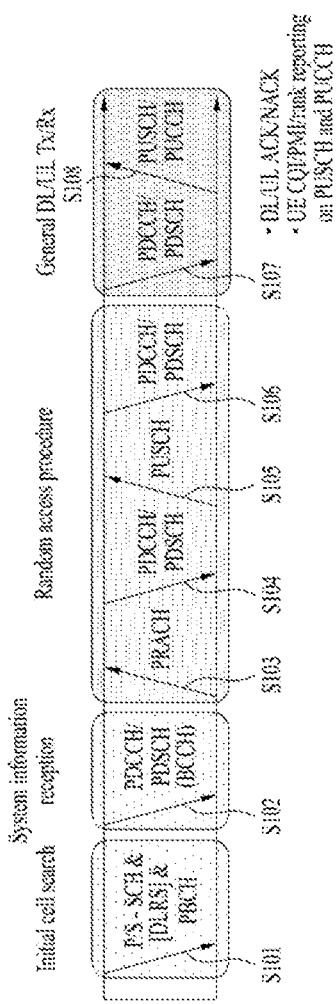
FIG. 1 illustrates physical channels used in a $3^{rd}$ generation partnership project (3GPP) long term evolution/long term evolution-advanced (LTE/LTE-A) system and a general signal transmission method using the physical channels.

The following description of embodiments of the present disclosure may apply to various wireless access systems including code division multiple access (CDMA), frequency division multiple access (FDMA), time division multiple access (TDMA), orthogonal frequency division multiple access (OFDMA), single carrier frequency division multiple access (SC-FDMA), and the like. CDMA may be implemented with such a radio technology as universal terrestrial radio access (UTRA), CDMA 2000, and the like. TDMA may be implemented with such a radio technology as global system for mobile communications (GSM)/general packet radio service (GPRS)/enhanced data rates for GSM evolution (EDGE). OFDMA may be implemented with such a radio technology as IEEE 802.11 (Wi-Fi), IEEE 802.16 (WiMAX), IEEE 802.20, evolved UTRA (E-UTRA), etc. UTRA is a part of universal mobile telecommunications system (UMTS). $3^{rd}$ generation partnership project (3GPP) long term evolution (LTE) is a part of evolved UMTS (EUMTS) that uses E-UTRA. 3GPP LTE adopts OFDMA in downlink and adopts SC-FDMA in uplink. LTE-advanced (LTE-A) is an evolved version of 3GPP LTE.

For clarity, the following description mainly concerns 3GPP LTE system or 3GPP LTE-A system, by which the technical idea of the present disclosure may be non-limited. Specific terminologies used in the following description are provided to help understand the present disclosure and the use of the terminologies may be modified to a different form within a scope of the technical idea of the present disclosure.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/UE that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In an NR system, downlink (DL) and uplink (UL) transmission may be performed through frames having duration of 10 ms and each frame may include 10 subframes. Accordingly, 1 subframe may correspond to 1 ms. Each frame may be divided into two half-frames.

1 subframe may include Nsymbsubframe, μ=Nsymbslot× Nslotsubframe, μ contiguous OFDM symbols. Nsymbslot represents the number of symbols per slot, μ represents OFDM numerology, and Nslotsubframe, μ represents the number of slots per subframe with respect to corresponding μ. In NR, multiple OFDM numerologies shown in Table 1 below may be supported.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 1 above, Δf represents a subcarrier spacing (SCS). μ and a cyclic prefix for a DL carrier bandwidth part (BWP) and μ and a cyclic prefix for a UL carrier BWP may be configured for a UE via UL signaling.

Table 2 below shows the number of Nsymbslot of symbols per slot, the number Nslotframe, μ of symbols per frame, and the number Nslotsubframe, μ of slots per subframe with respect to each SCS in the case of normal CP.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 9 |
| 2 | 14 | 40 | 4 |
| 3 | 14 | 80 | 8 |
| 4 | 14 | 160 | 16 |
| 5 | 14 | 320 | 32 |

Table 3 below shows the number Nsymbslot of symbols per slot, the number Nslotframe, μ of slots per frame, and the number Nslotsubframe, μ of slots per subframe with respect to each SCS in the case of extended CP.

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

As such, in an NR system, the number of slots included in 1 subframe may be changed according to SCS. OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to a BWP. A maximum of 4 BWPs may be configured for each of UL/DL link in 1 UE. Even if multiple BWPs are configured, 1 BWP may be activated for a given time period. However, when a supplementary UL (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc. The CCE may refer to a minimum unit for control channel transmission. That is, a minimum PDCCH size may correspond to 1 CCE. When an aggregation level (AL) is equal to or greater than 2, a network may group a plurality of CCEs to transmit one PDCCH (i.e., CCE aggregation).

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

A base station (BS) may signal information on a CORESET to a user equipment (UE). For example, a CORESET configuration is signaled to a UE for each CORESET. The CORESET configuration may include time duration of a CORESET (e.g., 1/2/3 symbols), a frequency domain resource of the CORESET, a precoder granularity, an REG-to-CCE mapping type (e.g., interleaved/non-interleaved), in case of the interleaved REG-to-CCE mapping type, an REG bundling size, an interleaver size, and the like.

If REG-to-CCE mapping for 1-symbol CORESET corresponds to the non-interleaved type, 6 REGs for CCE are grouped as a single REG bundle and the REGs for the CCE are consecutive. If there are multiple CCEs within 1 PDCCH (e.g., when an AL is equal to or greater than 2), the CCEs may be consecutive. A UE may assume the same precoding within 1 REG bundle according to a precoder granularity or assume the same precoding for a plurality of REG bundles.

If REG-to-CCE mapping for 1-symbol CORESET corresponds to the interleaved type, 2, 3, or 6 REGs may be configured as 1 REG bundle. For example, it may be able to support such an REG bundle size as {2}, {3}, {2,3}, {2,6}, {3,6}, or {2,3,6} as a subset rather than support all REG bundle sizes of 2, 3, and 6. In case of supporting an REG bundle size of {2,6}, 1 REG bundle may be configured by 2 REGs or 6 REGs. A UE may assume the same precoding within 1 REG bundle or assume the same precoding for a plurality of REGs.

When REG-to-CCE mapping is performed on a CORESET having duration equal to or longer than 2 symbols, it may define an REG bundle in time/frequency domain. If an REG bundle is defined in time domain, all REGs belonging to 1 REG bundle belong to the same RB and the REGs may correspond to symbols different from each other. If an REG bundle is defined in time-frequency domain, 1 REG bundle belongs to the same RB and may include not only REGs corresponding to symbols different from each other but also REGs belonging to a different RB.

When REG-to-CCE mapping is performed on a CORE-SET having duration equal to or longer than 2 symbols, it may be able to support time-first mapping to the REG-to-CCE mapping. An REG bundle may be configured to be identical to time domain duration of a CORESET in time domain. In case of the non-interleaved type, 6 REGs constructing a CCE may correspond to 1 REG bundle and the REGS of the CCE may be localized in time/frequency domain. In case of the interleaved type, 2, 3, or 6 REGs may correspond to 1 REG bundle and REG bundles may be interleaved within a CORESET. A UE may assume the same precoding within 1 REG bundle according to a precoder granularity or assume the same precoding for a plurality of REG bundles.

Decreasing Channel Estimation Complexity Related to PDCCH Reception

In the LTE system, an AL of control channel candidates that a UE should monitor on each subframe to receive the PDCCH and the number of the control channel candidates for each AL are fixed. Therefore, the UE attempts blind-decoding on the same number of control channel candidates on each subframe.

Figure 2:
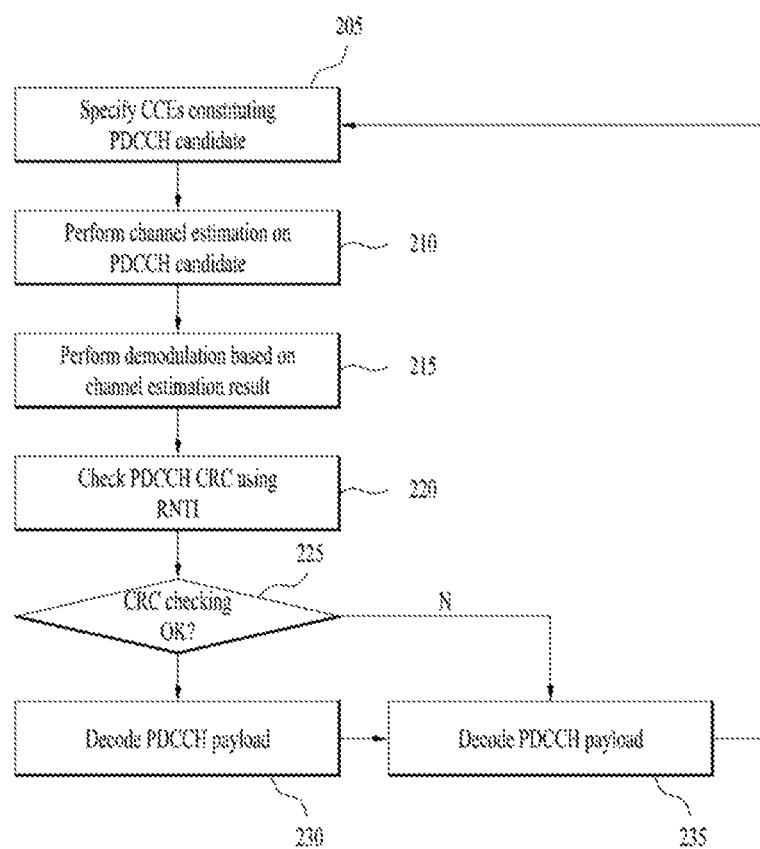
FIG. 2 is a flowchart illustrating a general operation of blind-decoding a physical downlink control channel (PDCCH) by a user equipment (UE).

FIG. 2 illustrates an operation of conventional UE for a process of blind-decoding a PDCCH. An attempt to the blind-decode may include a series of processes including, for example, examining, by the UE, a CRC for an aggregation of resources (e.g., PDCCH candidates) on which the PDCCH is likely to be transmitted using an assigned identifier (e.g., RNTI) thereto, and upon determination that the CRC check result is positive for the PDCCH candidates, performing demodulation and decoding the PDCCH candidates by the UE with assuming that a PDCCH being transmitted thereto is mapped to a corresponding PDCCH candidate.

Referring to FIG. 2, the UE specifies CCEs of a PDCCH candidate that is currently subjected to the blind-decoding among the PDCCH candidates included in the search space (205). One scheme of specifying the CCEs constituting the PDCCH candidate may employ a predefined hashing function. In order to avoid obscuring a key point of the present disclosure, a description of the hashing function itself is omitted. However, the details of the hashing function are disclosed in the standard document of TS 36.213.

The UE performs channel estimation for the PDCCH candidate based on the specified CCEs (210). For example, the UE performs channel estimation on CCEs (i.e., resources) constituting the PDCCH candidate. A reference signal may be used for the channel estimation.

The UE performs demodulation on the PDCCH candidate based on the channel estimation result (215). For example, based on the channel estimation result, the UE may acquire a complex symbol corresponding to a signal received on the CCEs constituting the PDCCH candidate. The UE may obtain bits corresponding to the complex symbol by performing demodulation on the obtained complex symbol.

The UE checks bits corresponding to a PDCCH CRC using a UE identifier (e.g., C-RNTI, SI-RNTI, P-RNTI, etc.) allocated to the UE (220). The BS may scramble the PDCCH CRC via the RNTI. In this connection, the UE may determine via the PDCCH CRC whether a corresponding PDCCH is transmitted to itself.

When the CRC check result based on the RNTI is positive, the UE decodes a PDCCH payload (230). When the result of CRC check based on RNTI is negative, the UE selects a PDCCH candidate next to the current PDCCH candidate and again attempts to perform a PDCCH detection associated with the selected PDCCH candidate (235).

In one example, a cell specific reference signal (CRS) is used for demodulation of the LTE PDCCH. In the LTE system, the CRS is transmitted on all subframes in the time domain. The CRS is transmitted in the entire system band in the frequency domain. The CRS may be used for channel estimation for demodulation of control/data channels. The CRS may also be used for channel state information (CSI) measurements. Optionally, the CRS may also be used for radio resource management (RRM) measurements.

Since the PDCCH demodulation is performed based on the CRS transmitted in the entire system band, the UE may obtain a channel estimation result for the entire system band by performing DFT-based channel estimation once. The UE could derive the channel estimation result for each RE of the PDCCH region from the channel estimation result for the entire system band.

In the NR system, a demodulation reference signal (DMRS) is used for demodulation of the PDCCH. Unlike the CRS of legacy LTE, the DMRS is not transmitted in the entire system band. The DMRS may be transmitted, for example, in a frequency band in which the PDCCH is transmitted, if necessary. Further, the DMRS may not be necessarily transmitted on all subframes.

In the NR system, a search space set for receiving the PDCCH is defined. A search space may be defined as an aggregation of candidates at a particular AL. The search space set may mean a set of search spaces having ALs. For example, a search space with AL 1 and a search space with AL 4 may constitute a single search space set. Configuration information for the search space set may be transmitted to the UE via a higher layer signaling (e.g., RRC). The configuration information for the search space set may include the AL of control channel candidates for which the UE should perform monitoring in the corresponding search space set, and the number of the control channel candidates for each AL. For example, the configuration information for the search space set includes the number of AL 1 candidates (e.g., 0 to 8), the number of AL 2 candidates (e.g., 0 to 8), the number of AL 4 candidates 8), the number of AL 8 candidates (e.g., 0 to 8) and the number of AL 16 candidates (e.g., 0 to 8). When the number of candidates having a corresponding AL is 0, the UE may not attempt blind-detection for the corresponding AL candidate. Further, the configuration information for the search space set may include information about periodicity (e.g., monitoring periodicity) at which the UE should monitor the corresponding search space set. One or more search space sets may be configured for the UE. The configuration information for the search space sets may be configured independently of each other.

Channel estimations for an NR control channel tend to increase according to the BW and duration of a CORESET configuration, and the BW of a configurable CORESET is not limited to specific RBs. Therefore, the channel estimation complexity of the NR control channel varies according to various parameters such as the distribution of search space candidates, a hashing function between an REG bundle and an AL, and so on.

The UE may perform blind-decoding on a large number of candidates during a specific time unit. From a network point of view, this has the advantage that scheduling flexibility may be improved because this may increase resource utilization. On the other hand, from the viewpoint of the UE, a decoding operation for the control channel, a reception operation of the PDSCH scheduled by the control channel, and a HARQ process in response to the PDSCH reception increase an operation complexity. This may cause a problem such as delay propagation.

In order to prevent such a problem from occurring, the maximum number of blind-decodings that the UE should perform during a specific time unit (e.g., 1 slot) may be defined. The maximum number of blind-decodings means the total number of candidates for which the UE must perform blind-decoding. Thus, the maximum number of blind-decodings may be referred to as the maximum number of the candidates which the UE monitors. The UE should be able to perform the blind-decodings the defined maximum number of times within a given time unit (e.g., one slot). The network may perform scheduling for multiple UEs based on the maximum number of blind-decodings.

Further, since NR-PDCCH operates based on the DMRS, the number of CCEs (or the number of REG bundles) may be defined as the number of resources for which the UE should perform channel estimation within a specific unit time. The UE performs channel estimation on a REG bundle basis. Since the number of REG bundles per CCE remains the same in the CORESET, the number of REG bundles or CCEs for which the UE should perform channel estimation in a certain time unit may be defined. The number of CCEs for which the UE should perform channel estimation during the unit time may mean the number of CCEs that do not overlap with each other. This is because, for overlapping CCEs, the UE may reuse the channel estimation result.

In one example, the maximum number of channel estimations may be defined as follows.

(i) The number of CCEs in all candidates: in one example, the number of CCEs belonging to all candidates that the UE should monitor for a unit time (e.g., 1 slot) may be defined as the maximum number of channel estimations. In this connection, the number of CCEs may mean the number of CCEs that do not overlap with each other.

When a wideband RS is used, the constraint on the maximum number of channel estimation as described above may not be applied.

The wideband RS is a type of DMRS that is transmitted for PDCCH demodulation. The wideband RS may be transmitted in a relatively wide frequency band. The wideband RS is associated with the same precoding assumption by the UE. In a CORESET where the wideband RS is not used, the UE assumes the same precoding within a 1 REG bundle. On the other hand, in a CORESET in which the wideband RS is used, the UE may assume that a RS is transmitted on all the REGs in a set of consecutive resource blocks and the UE may assume the same precoding within the corresponding consecutive resource blocks. Whether or not the wideband RS is used may be given as precoder granularity information in a CORESET configuration.

In one example, in the case of CORESET where the wideband RS is used, the UE may perform DFT-based channel estimation. In this case, the complexity of channel estimation may be greatly reduced. Therefore, the constraint considering the channel estimation complexity may not be applied.

Alternatively, the BS/UE may assume the channel estimation complexity of the CORESET configured with the wideband RS to be K or a predetermined value. For example, K may be a value proportional to the number of chunks (e.g., contiguous PRB chunks) in the CORESET, a value determined in consideration of a maximum number of chunks, or a value proportional to the 13 W (e.g., the amount of resources in the frequency domain) of the CORESET or the sum of the BWs of chunks in the CORESET.

As described above, a different channel estimation complexity method from that for the normal RS may be applied to the wideband RS.

(ii) Number of REG bundles in all candidates: When the wideband RS is used, the constraint on the maximum number of channel estimations may not be applied.

Depending on the duration of the CORESET for NR PDCCH transmission, the number of REG bundles constituting one CCE may be differently configured. Since the UE performs channel estimation on a REG bundle basis, the channel estimation complexity may be different between CCEs depending on the number of REG bundles per CCE. Therefore, the channel estimation complexity may be expressed based on the number of REG bundles. The channel estimation complexity may vary depending on the number of REG bundles per CCE.

(iii) Number of precoder bundles (regardless of whether the precoder bundles are the same):

When the wideband RS is used, the number of chunks (e.g., bundles of contiguous resources) within a CORESET may define the number of precoder bundles. When the wideband RS is used, the number of REG bundles may define the number of precoder bundles.

In the case of the wideband RS, when data (e.g., a control channel) is transmitted in consecutive frequency-domain resources in a CORESET, an RS (e.g., the same precoding RS) is transmitted in all REGs in a region in which the consecutive resources are located. In this case, the channel estimation complexity may be expressed as the number/BW of consecutive resources (i.e., chunks).

The maximum number of blind-decodings and the channel estimation capability as described above may be defined to be associated with each factor (e.g., whether the wideband RS is used, the SCS numerology, and whether multiple CORESETs overlap each other). For example, as shown in Table 4 below, for a specific SCS numerology, the maximum number of blind-decodings X in one slot and the channel estimation capability (e.g., the number of CCEs or the number of REG bundles) may be predefined as Y, or may be indicated to the UE via higher layer signaling.

TABLE 4

| Subcarrier spacing numerology | Maximum number of Blind decoding (i.e., candidates) | Maximum number of CCEs |
|---|---|---|
| 0 (15 kHz SCS) | X | Y |
| 1 (30 kHz SCS) | A | B |
| 2 (60 kHz SCS) | C | D |
| 3 (120 kHz SCS) | E | F |
| . . . | . . . | . . . |

Further, when a channel estimation capability (or a maximum number of channel estimations) is defined, the number of CCEs (the number of REG bundles or chunks) may mean the number of CCEs (the number of REG bundles or chunks) on which the UE actually needs to perform channel estimation. For example, on the assumption that the channel estimation capability is defined as the number of CCEs, when one CCE is included in N control channel candidates, the CCEs may be preferably counted as one CCE, instead of N. In other words, the afore-described number of CCEs may mean the number of non-overlapping CCEs.

If one CCE is included in multiple candidates in the same CORESET, the CCEs may be counted as 1. In general, the relationship between the number X of blind decodings and the number Y of channel estimations may be assumed to be Y m X where m may be a UE capability or a value that varies according to a numerology (e.g., SCS). Alternatively, different m values may be applied or supported depending on a processing time (e.g., fast/short processing time or slow/normal processing time) supported by the UE. Alternatively, m may vary according to a set of ALs supported by the UE. Alternatively, m may vary according to the highest AL in a set of ALs configured for the UE. For example, m=3 for a 15/30-kHz SCS, and m=2 for a 60/120/240-kHz SCS. For example, the number of channel estimations may be calculated by multiplying the number of blind detections by a weight determined by at least one of an AL, an SCS, a processing time, or the number of candidates for each AL.

When, as described above, the maximum number of blind-decodings and the maximum number of REG bundles (or CCEs) are defined, there may occur a situation where the blind-decoding for some control channel candidates may need to be limited depending on the CORESET size and/or the configuration (e.g., monitoring periodicity, etc.) of each search space set.

For example, when the size of CORESEST is small, thereby causing significant resource overlaps between different candidates, the UE may reuse the result of the channel estimation on a REG bundle basis. As a result, the number of control channel candidates monitored by the UE may increase to the maximum number of the REG bundles (or CCEs).

On the other hand, when the CORESET size is large and thus there is no resource overlap between the candidates, the UE must perform channel estimation on all REG bundles without re-using the channel estimation result. Thus, (because this situation causes the UE capability to exceed the maximum channel estimation capability), the UE may be unable to perform the blind-decoding on some of the candidates configured to be subjected to the blind-decoding.

In another example, different search space sets may have different monitoring periodicities. Thus, in a certain unit time (e.g., a common multiple between the monitoring periodicities), the UE may need to perform blind-decoding simultaneously on different search space sets. Accordingly, the channel estimation complexity increases only in the corresponding unit time. It may happen that the UE has to skip the blind-decoding for some candidates. In this connection, when the network and the UE are supposed to skip blind-decodings for different candidates therebetween, the transmission and reception performance of the control channel may be significantly degraded due to the different understanding in terms of the candidates to be blind-decoded between the network and the UE.

In one embodiment of the present disclosure, in order to solve such a problem, a scheme is proposed in which when the number of candidates and/or the number of channel estimations exceeds a predetermined maximum value, the UE skips some of the blind-decodings configured for a corresponding search space set. That is, the UE may skip blind-decoding for some control channel candidates in the corresponding search space set. To this end, an approach is needed by which the UE selects a candidate to be subjected to the channel estimation (or a candidate configured to be subjected to the blind-decoding).

In other words, when the number of blind-decodings exceeding the channel estimation capability of the UE is configured for the UE, it is not necessary for the UE to perform blind-decoding on all candidates beyond the channel estimation capability of the UE. However, the network and the UE have the same understanding as to which candidate for which the UE skips the blind-decoding. To this end, a priority rule related to the candidate selection/drop is required.

To avoid a situation in which the UE skips blind decoding for some candidates, the network may configure ALs and candidates within the capability of the UE in consideration of the number of blind decodings or the channel estimation capability. In this case, however, a channel estimation complexity may have to be counted differently from the actual channel estimation complexity of the UE. Although the actual channel estimation complexity may become relatively low depending on a reuse factor (e.g., the ratio of overlapping CCEs/REGs between monitoring candidates), the network have to assume the worst case in configuring ALs and candidates because the network may not count the complexity in consideration of an actual situation. An example of the worst case may be to compute the channel estimation complexity on the assumption that the candidates do not overlap with each other at all. This may mean that the complexity should be counted separately for different CORESETs.

In this case, the estimated channel estimation complexity may be greater than the actual channel estimation complexity, and the smaller the bandwidth, the greater the difference. Therefore, the network/UT may calculate the channel estimation complexity by assuming a reuse factor. For example, this reuse factor may be a function of a BW or may be determined by higher-layer signaling.

The actual number of CCEs/REGs or channel estimations counted in consideration of the reuse factor may exceed the capability of the UE, In this case, the UE may skip blind decoding for all candidates, read some candidates depending on UE implementation, or perform a different operation depending on the LIE implementation. In this situation, to lose as few candidates as possible, that is, to secure as many available candidates as possible, the UE/network may assume that an AL used in a corresponding search space is equal to the AL of the most recent DCI (e.g., the most recent DCI which has been successfully received). Therefore, the UE may reduce the number of blind decodings by first attempting to detect candidates of the same AL as the AL of the most recent DCI or by attempting to detect candidates for only a corresponding AL. Alternatively, the UE may assume that only the CORESET carrying the most recent DCI is used. As such, the history-based candidate selection scheme may be used. The UE may reduce the number of actually performed blind decodings/channel estimations by performing only decoding for the CORESET and AT of the most recent DCI that has been successfully decoded.

This assumption may apply only to a USS. For example, for a CORESET including a CSS, it may be assumed that this case is prevented by not using a reuse factor or by assuming a very small reuse factor at the LIE/network, or candidates are unreadable depending on the implementation of the UE. Alternatively, the network/UE may assume that a specific AL (e.g., AL=8 or 16) is fixedly used in the case.

To avoid this constraint, the network may configure a search space without considering the channel estimation complexity significantly, and temporarily reduce the number of candidates by the following operations when the channel estimation complexity exceeds the UE capability.

<Priority Determination>

Approaches proposed below may be applied alone or in combination with each other. Further, the following approaches may be implicitly applied to various situations where the UE may arbitrarily skip a candidate without a separate signaling by the network. Alternatively, the network may instruct the UE to use a specific approach. Hereinafter, CORESET may be interpreted as a variety of resource units or search space sets for a configuration of a search space.

Example 1) CORESET Priority

In an NR system, multiple CORESETs may be configured for a single UE. A priority for a number of CORESETs may be defined. Depending on the factor including the channel estimation complexity, the UE may preferentially skip a candidate in a CORESET with low priority, if necessary. That is, the UE preferentially monitors a candidate in a CORESET having the highest priority, and, subsequently, the UE may perform the blind-decoding until a maximum channel estimation capability thereof is reached.

In one example where the implicit priority is applied, the priority may be determined according to the CORESET Configuration in the following manner. Alternatively, when the priority is explicitly determined/indicated by the network, signaling may be performed to determine/indicate the priority based on the CORESET configuration below.

(i) CCE-to-REG Mapping

In the NR system, the CCE-to-REG mapping type of each CORESET may be determined depending on whether interleaving is applied to each CORESET. An example of when interleaving is used may include: a case when the UE-common control information (e.g., cell-common control information such as system information or the UE group-common control information such as power/slot format) is transmitted in a corresponding CORESET, or a case when there is no feedback or inaccurate feedback on the channel state between the BS and the UE, thereby making it inappropriate for the BS to use UE-dedicated beamforming.

When the UE must perform blind-decoding for a plurality of CORESETs using the same time resource, and the UE must skip the blind-decoding for a specific candidate due to the channel estimation complexity (e.g., when the complexity exceeds a predefined maximum number of REG bundles (or CCEs)), a specific CCE-to-REG mapping type may be configured or predefined to have a higher priority.

For example, when the interleaving-applied CORESET 1 and the interleaving-free CORESET 2 are configured for the UE, the UE may preferentially perform blind-decoding for candidates belonging to the CORESET 1 to which the interleaving is applied, rather than blind-coding for candidates belonging to the CORESET 2 to which the interleaving is not applied.

(ii) RS Type (Precoder Granularity)

In one example, the priority may be determined based on precoder granularity configured for each CORESET.

As described above, the precoder granularity in the NR system may correspond to a REG bundle size in the frequency domain, or to the wideband RS. When the wideband RS is used and when control information is transmitted on consecutive RBs in a CORESET, the UE may assume followings: the RS is transmitted on all the REGs belonging to the corresponding consecutive RBs, and the same precoding is used in the corresponding consecutive RB regions.

In one example, a CORESET for which the wideband RS is configured may have a higher priority than a CORESET for which the wideband RS is not configured. In general, the wideband RS may be used as an approach to cover a wide coverage or to increase a decoding performance. Further, the wideband RS may be used when more important information is delivered to a large number of UE. Thus, it may be desirable to assign a higher priority to the CORESET for which the wideband RS is configured.

(iii) RS Configuration

A high priority may be assigned to a CORESET configured with a shared RS. When a CORESET is configured with a CSS or a group common search space (GSS), the UE/network may assume that the CORESET is configured with a shared RS.

(iv) Transmission History

A highest priority may be assigned to a CORESET carrying the most recent DCI (e.g., limited to UE-specific DCI). A transmission history may be restrictively applied to information of the same DCI format or information scrambled with the same RNTI.

(v) Number of Search Space Sets Included in CORESET

CORESETs may be prioritized based on the numbers of search space sets associated with the CORESETs in a slot in which a candidate is to be dropped. When a specific CORESET is associated with many search space sets, the channel estimation complexity of the CORESET may be reduced greatly due to overlap between candidates. Therefore, to reduce the substantial channel estimation complexity of the UE, a low priority is preferably assigned to a CORESET associated with a small number of search space sets.

For example, if CORESET A is associated with three search space sets and CORESET B is associated with one search space set in a slot in which a candidate is to be dropped, a lower priority may be assigned to CORESET B associated with the smaller number of search space sets. Accordingly, a candidate to be dropped may first be selected from CORESET B.

When it is said that a specific CORESET includes many search space sets, this may imply that a blocking probability between candidates increases. Therefore, a CORESET with a small number of allocated search spaces may be selected preferentially.

Similarly, the priority of a CORESET may be determined according to the number of candidates belonging to the CORESET. For example, as the CORESET includes more candidates in total in a corresponding slot, a lower priority may be assigned to the CORESET. In consideration of blocking between candidates, a high priority may be assigned to a CORESET with a small number of candidates.

(vi) Number of Available CCEs in CORESET (or the Amount of Resources in CORESET)

As a CORESET includes more available CCEs, the probability of overlapping between candidates decreases, which may imply that a channel estimation reuse frequency is decreased. Therefore, as a CORESET has more available CCEs, a lower priority may be preferably assigned to the CORESET.

This may mean that the priority of each CORESET is determined according to the amount of resources in the CORESET. For example, a lower priority may be assigned to a CORESET with a lager CORESET BW (e.g., more RBs) and/or a longer CORESET duration (e.g., more symbols). On the contrary, a higher priority may be assigned to a CORESET with a smaller amount of resources in order to reduce blocking between candidates.

In another method, CORESETs may be prioritized according to their CORESET indexes. For example, on the assumption that CORESETs are prioritized implicitly, it may be predefined that the UE first performs blind decoding for a CORESET with a lowest (or highest) CORESET index. When CORESETs are prioritized by explicit signaling, the network may signal the priority of each CORESET. The priorities of CORESETs may be determined in a combination of the above-described various methods. For example, a highest priority may be assigned to a CORESET configured with a CSS, and if there are two or more CORESETs configured with the CSS, the priorities of the CORESETs may be further determined based on their CORESET indexes. Further, when it is said that a priority is high in the above description, this may mean that a candidate is not dropped in a corresponding resource unit.

Example 2) Search Space Set Priority

The UE may receive configurations for different search space sets from the network. The monitoring periodicities for different search space sets may be configured differently. In a specific time resource, different search space sets may overlap. In this case, for a specific search space set, the priority may be configured to be higher via predefinition or via network configuration (e.g., higher layer signaling). When the UE has to skip blind-decoding for some candidates, the UE may firstly skip candidates belonging to a search space set having a low priority. Thus, it is preferable for the network to identify candidates for which the UE will skip blind-decoding and not to map a PDCCH of the UE to the identified candidate. In other words, it is preferable for the network to map the PDCCH to a candidate to be monitored by the UE.

In this way, the priority may be determined/configured in a unit of a search space set. The priority may be determined via predefinition or network signaling. For example, the priority may be determined based on at least one of following (i) to (iv) elements. The present disclosure is not limited thereto.

(i) Search Space Type

The search space set may be largely classified into the user specific search space set (e.g., USS) and the cell-common search space set (e.g., CSS).

According to one embodiment of the present disclosure, the priority may be determined based on a DCI format that the UE should monitor in each search space set and/or on a search space type.

For example, a higher priority may be assigned to a search space set related to a CSS and/or a GSS than a search space set related to a USS. For example, when the search space set(s) related to the CSS/GSS overlaps with the search space set(s) related to the USS, and the UE is not capable of monitoring all PDCCH candidates in the overlapped time resources (e.g., the number of candidates to be monitored exceeds a maximum number of blind detections and/or the number of CCEs for which channel estimation is to be performed exceeds a maximum number of CCEs), the UE may first attempt to detect (e.g., blind-decode) a PDCCH in candidates included in the search space set(s) related to the CSS/GSS. When the UE still has an extra processing capability (e.g., when the UE is capable of additional blind detection and channel estimation) after blind detections and channel estimations of all of the search space set(s) related to the CSS/GSS, the UE may also attempt to detect a PDCCH in the search space set(s) related to the USS. When the UE reaches the maximum number of blind detections and/or the maximum number of CCEs, the UE may skip a candidate belonging to a low-priority search space set (e.g., the search space set related to the USS).

Accordingly, the network should be able to determine the candidates monitored by the UE and the candidates skipped by the UE. Then, the network may map a PDCCH to a candidate monitored by the UE based on a result of the determination.

For example, priority may be given in this order: CSS, GSS, and USS.

(ii) Aggregation Level

As described before, ALs of candidates to be monitored by the UE may be configured for each search space set in the NR system.

For example, the priority of each search space set may be determined according to ALs configured for the search space set. For example, a higher priority may be given to a search space set with higher (or lower) ALs.

(iii) The Number of Candidates (CCEs or REG Bundles)

The priority of each search space set may be determined according to the number of candidates (the number of CCEs or REG bundles) to be monitored in the search space set.

For example, a relatively low priority may be assigned to a search space set with a large number of candidates for blind decoding. This may be preferable in that the UE may perform blind decoding for more search space sets in given time resources.

(iv) Search Space Set Index

In a similar manner to the exemplary description of the CORESET priority as discussed above, a priority may be implicitly/explicitly defined based on an index of the search space set. For example, a search space set with a lower index may be given a higher priority.

For example, when the UE cannot monitor both the search space set A with an index 1 and the search space set B with an index 2 (e.g., when the UE capability exceeds the number of blind-decodings and/or channel estimation capability (e.g., the number of CCEs), the UE performs blind-detection on candidates in the search space set A having a lower index. The UE may skip blind-detection for candidates in the search space set B with a higher index. In such a situation, when the BS wishes to transmit the PDCCH to the UE, the BS may decide to transmit a corresponding PDCCH on the search space set A with a lower index.

In this way, the priority between the search space sets is determined. Thus, even when a plurality of search space sets are configured for one UE, and time resource overlap between the search space sets occurs at the time corresponding to a common multiple of monitoring periodicities for the plurality of search space sets, the UE and BS may clearly determine which candidate that the BS and the UE should use to transmit and receive the PDCCH. Further, the blind-decoding/channel estimation for some candidates may be skipped. This may reduce the processing complexity of the UE.

(v) Monitoring Periodicity

If the UE skips blind decoding for a search space having a long monitoring periodicity, the UE may take much time to receive control information in the search space. In the worst case, the UE may continuously skip blind decoding for the search space according to the priority of the search space. Therefore, a high priority may be assigned to a search space having a long monitoring periodicity. On the contrary, a low priority may be assigned to a search space having a long monitoring periodicity.

(vi) Explicit Priority on Search Space

The network/UE may set a priority for each search space.

(vii) Transmission History

A highest priority may be assigned to a search space in which the most recent DCI has been detected.

As described above, search space sets may be prioritized based on one or more of (i) to (vii). For example, assuming that the priorities of search space sets are determined according to (i) and (iv), the UE and the BS may operate as illustrated in FIG. 3.

Figure 3:
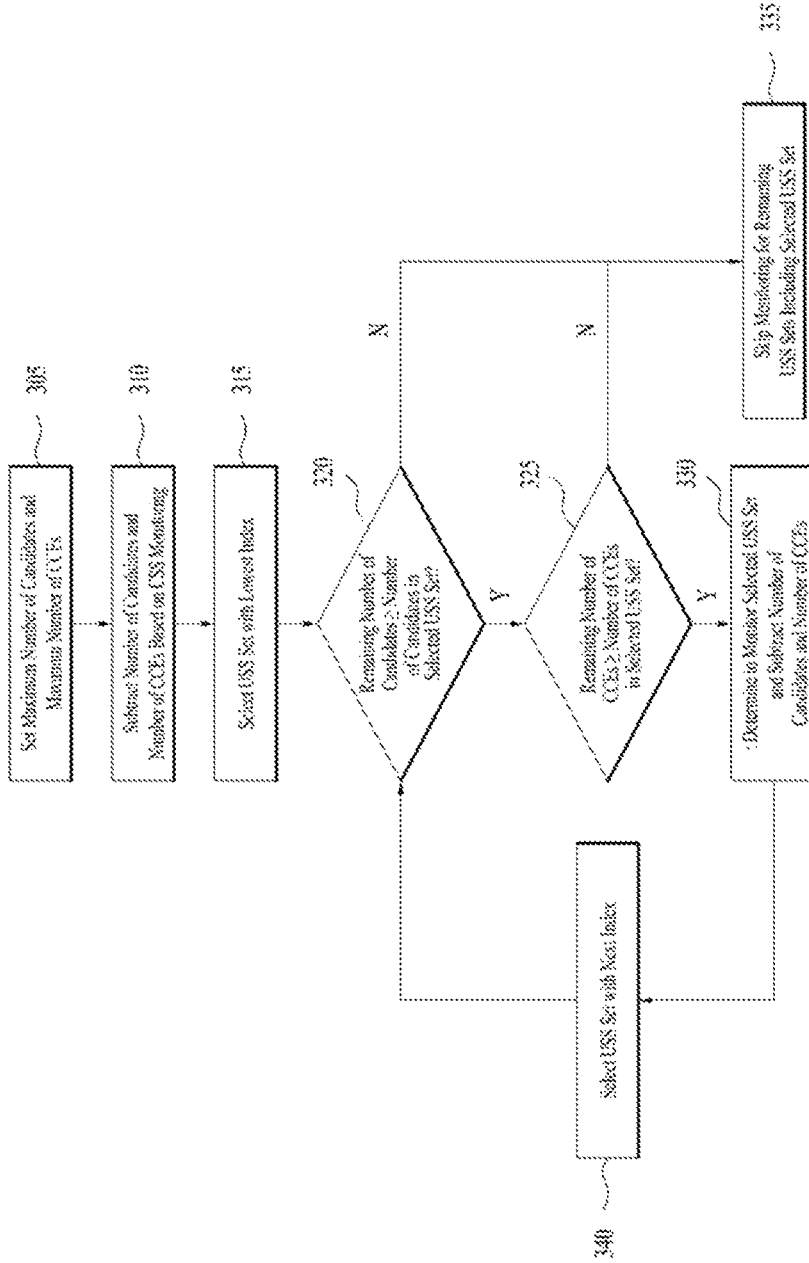
FIG. 3 is a flowchart illustrating prioritization of search space sets for PDCCH blind-detection according to an embodiment of the present disclosure.

Referring to FIG. 3, the UE/BS may determine the maximum number of candidates to be monitored and the maximum number of channel-estimated CCEs (e.g., the maximum number of non-overlapping CCEs) during a unit time (e.g., 1 slot) (305). The maximum number of the candidates and the maximum number of CCEs may be determined based on the SCS numerology as described above.

The UE assigns a high priority to the search space set(s) related to the CSS. The UE preferentially performs blind-decoding on the PDCCH candidates in the search space set related to the CSS. The process of performing blind-decoding may include performing channel estimation based on the reference signal by the UE. For example, the UE performs demodulation on a PDCCH candidate based on the channel estimation result. The UE may attempt to decode based on a complex symbol obtained via the demodulation. The decoding attempt by the UE may include performing, by the UE, a PDCCH CRC check using the RNTI having a UE-specific/cell-specific/group-specific attribute allocated to the UE. The maximum number of blind-decodings and the maximum channel estimation capability (e.g., the maximum number of CCEs) may be subtracted based on the attempt to detect the PDCCH for the CSS (310).

The UE may attempt to detect the PDCCH in the search space set(s) related to the USS based on the residual number of blind-decodings by which the UE may perform and the residual channel estimation capability of the UE. When there are a plurality of search space sets related to the USS, and the UE has to monitor the plurality of sets of search spaces simultaneously, the UE may consider an index of each search space set related to the USS.

For example, the UE performs blind-detection/channel estimation for a PDCCH candidate preferentially in a search space set corresponding to a USS having the lowest index. Then, the UE performs blind-detection/channel estimation for a PDCCH candidate in a search space set corresponding to a USS having the next lowest index. The UE may skip the blind-detection/channel estimation for a PDCCH candidate in a search space set corresponding to a USS having a high index resulting in that the UE capability exceeds the maximum number of blind-decodings by the UE or the maximum channel estimation capability of the UE.

Referring again to FIG. 3, the UE selects a search space set related to the USS having the lowest index (315). The UE subtracts the maximum number or capability by a number or capability based on the CSS monitoring. The UE determines whether the residual number of candidates and the residual number of CCEs are sufficient to monitor the search space set corresponding to the currently selected USS (320 and 325).

When at least one of the residual number of candidates and the residual number of CCEs is not sufficient to monitor the search space set corresponding to the currently selected USS, the UE skips the monitoring of the remaining search space sets including the search space set corresponding to the currently selected USS (335).

To the contrary, when both of the residual number of candidates and the residual number of CCEs are sufficient to monitor the search space set corresponding to the currently selected USS, the UE may decide to monitor the search space set corresponding to the currently selected USS and then the UE subtracts the residual number of candidates and the residual number of CCEs by the number based on the monitoring of the search space set corresponding to the currently selected USS (330). Thereafter, the UE selects a search space set corresponding to a USS having the next lowest index (340).

The BS may distinguish between a search space set for which the UE attempts PDCCH detection and a search space set for which the UE skips PDCCH detection, as in the UE operation as described above. The BS may select a candidate in the search space set for which the UE attempts PDCCH detection and may map/transmit the PDCCH of the UE to/on the selected candidate.

Example 3) Aggregation Level

When prioritization is performed to skip monitoring for a candidate, the prioritization may be based on ALs. For example, a high (or low) priority is assigned to a high AL, and a candidate of a low-priority AL may be preferentially skipped.

In another method, the priority for each AL may be determined based on the number of candidates for each AL. For example, the priority for an AL with a larger number of candidates to be subjected to the blind-decoding may be configured to be lower. In this way, the number of ALs for which the UE performs blind-decoding may be increased. This may increase the scheduling flexibility of the network.

In another method, the number of candidates for each AL may be adjusted, while an AL for blind decoding is maintained. For example, when a feedback for a channel state of the UE is not correct, it is desirable for the UE to perform blind decoding for various ALs. Therefore, candidates to be blind-decoded may be selected from among the candidates of ALs in a round-robin manner.

For example, it is assumed that the UE should perform blind-detection on 4, 4, 2, and 2 candidates for ALs 1, 2, 4, and 8, respectively. In this regard, the UE may preferentially select a candidate with the highest (or lowest) AL one by one. In one example, the priorities of the candidates may be determined in a following order: AL8 1st candidate→AL4 1st candidate→AL2 1st candidate→AL1 1st candidate→AL8 2nd candidate→AL4 2nd candidate→AL2 2nd candidate→AL1 2nd candidate→AL2 3rd candidate→AL1 3rd candidate→AL2 last candidate→AL1 last candidate. The UE performs blind-detection for up to a candidate corresponding to a remaining channel estimation capability of the UE. The UE may skip the blind-detection for subsequent candidates. In this example, it is assumed that a candidate is selected in a descending order of AL, but the present disclosure is not limited thereto. Different kinds of rules may be applied. For example, an AL ascending order may be applied to select the candidate. An ascending (or descending) order of AL may be applied in an inversely proportional or forward proportional manner to a number of candidates.

When the feedback on the channel state from the UE is not correct, it is desirable to perform blind-decoding on various ALs. Thus, the UE may select a candidate to be subjected to the blind-decoding in each AL using a Round-robin approach.

As described before, based on the AL (e.g., X) of the most recently received DCI, candidates may first be allocated to an AL equal to ½ of the AL (e.g., X/2) and an AL equal to the double of the AL (e.g., 2*X). For example, the network/UE may first allocate candidates to X, X/2, and 2X from among a total number of candidates, and skip/drop as many candidates as needed in the remaining ALs. If the total number of candidates is insufficient to be allocated even to the 3 ALs, the network/UE may prioritize the ALs in the order of X/2->2X->X. This may be interpreted as history-based AL selection. A high priority may be given to the AL (or the AL and its close ALs) of the most recent successfully decoded candidate.

Example 4) Frequency

A candidate (or CCE/REG) located at a lower (or higher) frequency may be assigned a higher priority. For example, when the UE performs blind-detection in a corresponding slot, the UE preferentially performs blind-detection on a candidate located at the lowest frequency. Then, the UE may perform blind-detection while the UE increases (or decreases) a frequency up to a frequency value where the UE exceeds its channel estimation capability.

Example 5) Resource (e.g, Candidate, CCE, REG) Index

A higher priority may be assigned to a resource (e.g., a candidate, CCE, or REG) having a lower (or higher) index. That is, when the UE performs blind detection in a corresponding slot, the UE starts from a candidate of a lowest index, and performs blind detection by increasing (or decreasing) the index to an index at which its channel estimation capability is exceeded. Method 5 may be used as a method of selecting/skipping at a candidate level in Methods 1, 2 and 3.

Example 6) Overlap

Overlap between candidates may reduce blind decodings and/or a channel estimation complexity. When the UE monitors different RNTIs in different search space sets but performs blind decoding in the same resources (e.g., candidate) with the same DCI size, the UE may monitor two RNTIs by one blind decoding. When different candidates overlap with each other in the same CORESET, the UE may perform one channel estimation in the overlapped area between the candidates and share the result of the channel estimation for the different candidates. Therefore, when the UE drops a candidate in view of an exceeded blind decoding limit and/or channel estimation limit, overlapping resources may be used as a reference for prioritization. Because different CORESETs may have different CORESET features (e.g., CCE-to-RE mapping, REG bundle sizes, and so on), the following proposed methods (1) to (4) may be preferably applied to candidates in one or more search space sets associated with the same CORESET.

(1). Prioritization of Candidate According to Number of Overlapping Candidates

The UE/network may determine the priority of each candidate by counting the number of candidates overlapping with the candidate. For example, as the candidate overlaps with more other candidates, channel estimation reuse is increased. Therefore, the UE/network may assign a high priority to the candidate to exclude the candidate from candidate dropping or assign a low dropping priority to the candidate.

A candidate with a higher AL occupies more resources and overlaps with another candidate with a higher probability. Therefore, a candidate with a lower AL may have a higher probability of being dropped according to this method.

(2). Prioritization of Candidate According to Number of Overlapping CCEs

The network/UE may determine the priority of each candidate by counting the number of CCEs overlapping with the candidate. When the candidate overlaps with more CCEs, this means that a channel estimation result is reused more times. Accordingly, the priority of the candidate may be set in proportion to the number of overlapping CCEs.

Alternatively, the priority of the candidate may be calculated by counting the number of overlapping CCEs or using a ratio of used CCEs. This may also be used in the above method of counting overlapping candidates. For example, when AL4 candidate 1 overlaps with AL4 candidate 2 over two CCEs and with an AL8 candidate over four CCEs, the CCE occupancy of AL4 candidate 1 may be calculated to be 250%, and a candidate with a low occupancy may first be dropped.

A candidate with a higher AL occupies more resources and has a high probability of overlapping with another candidate. Therefore, a candidate with a lower AL may have a higher probability of being dropped in this method.

(3). Prioritization of Candidate According to Number of Non-Overlapping CCEs

When the UE selects a candidate to be dropped in order to satisfy a channel estimation complexity limit, the UE preferably drops as few candidates as possible to guarantee scheduling flexibility of the network.

The network/UE may set the priority of each candidate by counting the number of CCEs which do not overlap with other candidates in the same CORESET, among the CCEs of the candidate. For example, the network/UE may set the number of CCEs which do not overlap with other candidates in the same CORESET as the priority of the candidate. As in (2), the UE may drop a candidate based on the ratio of non-overlapping CCEs in the candidate. For example, when only one CCE of an AL4 candidate overlaps with another candidate in the same CORESET, the ratio of non-overlapping CCEs in the AL4 candidate is calculated to be 75%, and the network/UE may first drop a candidate with a high ratio of non-overlapping CCEs.

The UE may set the number of CCEs of each candidate, which do not overlap with other candidates in the same CORESET as the priority of the candidate, and may drop candidates, starting from a candidate with more non-overlapping CCEs.

A candidate with a higher AL occupies more resources and has a high probability of overlapping with another candidate. Therefore, a candidate with a higher AL may have a higher probability of being dropped in this method.

(4). The network/UE may not drop a candidate fully overlapping with another candidate. This may imply that when all CCEs of a specific candidate overlap with other candidate(s), the specific candidate is not dropped in a drop procedure Further, after the drop procedure, the network/UE may cancel the dropping of a candidate with all CCEs included in other candidates, among dropped candidates. Additionally, only when the number of blind decodings in a corresponding slot is smaller than the blind decoding limit, the dropping of the specific candidate may be cancelled. That is, when the number of blind decodings in the specific slot is equal to or larger than the blind decoding limit, it may be impossible to cancel the dropping of the candidate selected to be dropped.

The above methods (1) to (4) may be performed in combination. For example, the network/UE may drop candidates, starting from a candidate including a smallest number of non-overlapping CCEs among candidates of a lower-priority AL in a lower-priority CORESET (and/or search space set) in a slot in which the channel estimation limit is exceeded. In the presence of a plurality of candidates with the same number of non-overlapping CCEs, the network/UE may start from a candidate with a smallest number of overlapping CCEs (or a candidate overlapping with a smallest number of other candidates) among the candidates. When the candidates even have the same number of overlapping CCEs, the UE may drop the candidates in descending (or ascending) order of candidate indexes. This may imply that when all CCEs of a candidate are included in other candidates, the candidate is not dropped.

Further, it is proposed that in a situation where a fully overlapped candidate, that is, a candidate with all CCEs overlapping with other candidate(s) is supposed to be dropped due to its priority, the network/UE does not drop the candidate. Considering that dropping a candidate is a process of matching a channel estimation capability, when a channel estimation complexity limit is exceeded, dropping a fully overlapped candidate does not reduce a channel estimation complexity and thus the candidate is preferably excluded from dropping. This may be interpreted as that the network/UE does not drop a candidate which does not reduce the channel estimation complexity even though it is dropped. Whether the candidate is to be dropped or not may depend on later dropping of another candidate. For example, in the case where a specific candidate fully overlaps with another candidate and thus is excluded from dropping, when the candidate becomes partially overlapped as a result of dropping the other candidate, the candidate may be dropped.

After the candidate drop procedure ends, the network/UE may cancel the dropping of a candidate which does not affect the channel estimation complexity among the dropped candidates. The cancellation of the dropping of the candidate that does not affect the channel estimation complexity may increase the number of candidates to be blind-decoded and guarantee the scheduling flexibility of the network.

Example 7) Default Candidate

When the network/UE drops candidates in excess of the limit for the channel estimation complexity, it may not be preferable to drop a whole specific AL, a whole specific search space set, and/or a whole specific CORESET. Accordingly, a default candidate which is to be necessarily blind-decoded by the UE may be configured for each AL, each search space set, and/or each CORESET. When candidate dropping is performed, the default candidates may be excluded from target candidates to be dropped.

The simplest method of configuring a default candidate is to set a candidate having a lowest (or highest) index in a resource unit as a default candidate. When multiple UEs use the same CORESET and the same search space set, this method may impose a constraint on scheduling of the network.

Another method of configuring a default candidate is to use a UE ID. For example, the network/UE may drop a candidate of an index corresponding to a (UE ID) mod (the number of candidates in a resource unit) in the resource unit.

A default candidate may be configured on a CORESET basis and/or on a search space set basis, not on a candidate basis. The default candidate may also be configured based on an RNTI type or a DCI format (size). For example, candidates configured for monitoring DCI scrambled with an SFI-RNTI may be predefined to be excluded from dropping, or a condition for a candidate to be excluded from dropping may be indicated by higher-layer signaling. When a default candidate is configured, the UE may exclude the default candidate from dropping and determine a candidate to be dropped by applying one or a combination of the above-proposed priority rules.

Further, information about the default candidate may be delivered to the UE by higher-layer signaling or the like. For example, the network may set specific candidate(s) of specific search space(s), specific AL(s), and/or a specific AL as default candidate(s) and indicate the default candidate(s) to the UE. The UE may not drop the candidate(s) signaled by the network. For example, the UE may necessarily blind-decode the candidate(s).

In the above methods except for Example 1), when there are multiple CORESETs and search space sets associated with the CORESETs, a priority may be applied to each CORESET or channel estimation may be applied separately to each CORESET according to the number of blind detections. This may imply that a channel estimation budget is set for each CORESET or search space set. For example, the UE may distribute a given channel estimation capability to CORESETs or search space sets, and perform given blind decoding within each CORESET (or search space set) according to the above-proposed priority rules.

A priority rule may be applied in a combination of the above-proposed methods. For example, the UE may control a blind detection skip ratio for each CORESET by prioritizing CORESETs and weights the number of blind decodings for each CORESET according to the priority of the CORESET, and thus may select a candidate for which blind detection is to be skipped in each CORESET by using a part of the above rules. In another example, when there are many CCEs to be skipped, the network/UE may drop the candidates one by one in the order of a lower-priority AL in a lower-priority search space of a lower-priority CORESET. When an additional candidate needs dropping after candidate dropping is completed for a corresponding search space set, a candidate to be dropped may be determined according to its priority in the next search space (or CORESET).

When needed, the UE may report its channel estimation capability (and/or priority rule) to the network. For example, the UE may report its blind decoding capability and channel estimation capability. The network may select resources to be used for DCI transmission to the UE based on the report of the UE. Further, the network may predict candidates that the UE will blind-decode based on the report of the UE, select a candidate from among the candidates to be blind-decoded, and transmit DCI in the candidate. The UE may report the blind decoding capability (e.g., the number of candidates) and the channel estimation capability (e.g., the number of CCEs) separately, or only one capability (e.g., the channel estimation capability). Further, a reference configuration for a capability reported by the UE may be predefined or signaled to the UE. For example, the UE may report, as a blind decoding capability, a value calculated based on a specific DCI format, a specific information bit size, or a specific coded bit size. Further, the UE may report, as a channel estimation capability, a value calculated based on a specific RS type (or a precoder granularity such as a wideband RS or a narrowband RS) and/or a specific REG bundle size (e.g., 6 REGs). This is done to make the most use of the capability of the UE.

Example 8) RNTI

Further, candidates may be prioritized according to RNTIs. For example, the candidates may be prioritized in the following order of RNTIs: SFI-related RNTI, PI-RNTI (e.g., related to pre-emption), paging (P)-RNTI, RNTI transmitted in fallback DCI (e.g., RA-, TC-, or SI-RNTI), and RNTI transmitted in non-fallback DCI. A TPC-related RNTI may also be prioritized according to a target signal. This may mean that the priority of a corresponding RNTI is determined according to how much the corresponding RNTI affects a UE operation. For example, the SFI-related RNTI determines a UL/DL direction of a resource in a slot, and the pre-emption-related RNTI has a great influence on the decoding operation of the UE because it may deliver information about rate matching or the like. Therefore, higher priorities may be assigned to these RNTIs.

Because an RNTI, a DCI format, and so on may be set in a search space set configuration, Example 6 may be included in Example 2 (search space set level priority). To apply the above proposal in a broad range, candidates may be prioritized according to DCI formats.

<Configurable Hashing Function>

The above description is about the priority determination method for determining a specific candidate for which the blind-detection is skipped when the blind-detection for the specific candidate should be skipped due to the channel estimation complexity.

In the following, additionally, an approach for differently configuring hashing functions between situations to reduce channel estimation complexity is proposed. The hashing function serves to inform CCEs corresponding to a candidate that the UE should monitor in a predetermined CORESET. For example, the UE may specify the CCEs constituting each candidate using the hashing function.

Approaches as described below may be applied only when a corresponding situation exceeds a maximum channel estimation capability of the UE.

A nested structure may be considered to reduce channel estimation complexity. The nested structure may be employed as an approach for reusing a channel estimation result between different candidates by inducing resource overlap between candidates with different ALs.

In one example, for a candidate with the highest AL, the UE applies an existing hashing function (e.g., a hashing function of the EPDCCH approach) to all CORESETs, and, then, the UE may specify CCEs constituting the candidate with the highest AL. However, for candidates with lower ALs, the UE may apply the existing hashing function to a resource occupied by the candidate with the largest AL, rather than to all CORESETs. In this case, since the candidates with lower ALs always belong to the resource occupied by the candidate with the highest AL, the channel estimation result may be reused for the nested or overlapping resources.

According to one embodiment of the present disclosure, when the number of candidates exceeding a number corresponding to the channel estimation capability which may be performed in a specific time resource are configured for the UE, the UE may apply a hashing function for the nested structure without skipping the candidates.

In one example, when the number of candidates configured for a single search space set exceeds a channel estimation complexity that the UE may perform within the unit time, the UE/BS may assume that the nested structure is applied to the corresponding search space set. For example, in a conventional case where there is no problem in channel estimation complexity, for candidates with ALs, the UE applies a hashing function to all CORESETs. To the contrary, when the channel estimation complexity exceeds a complexity degree that the UE may deal with within the unit time, the UE may apply a hashing function for a lower AL to a resource occupied by the candidates having the largest AL.

When a channel estimation complexity exceeds a tolerance due to the overlap between multiple search space sets, the above-mentioned priority determination approach and the nested structure may be used together. In one example, when a CORESET priority is configured and the channel estimation complexity exceeds the tolerance, the UE may apply the nested structure to a CORESET having a low priority.

In one example, the configurable hashing function may be applied as follows. The following approaches may be applied only when the current situation exceeds the UE's channel estimation capability.

When the number of potential channel estimations that the UE should perform for a corresponding CORESET/search space set exceeds a specific limit, parameters for configuring the nested structure may be applied to initialization of the hashing function. This may mean applying different hashing functions to the CORESET/search space sets. Alternatively, this may mean that a hashing function is applied that operates on different resource regions.

It may be determined whether the nested structure is applied to the configuration of the CORESET or search space set according to the AL. For example, the UE/BS may assume that the nested structure is applied when AL=16 or 8 is configured. In other words, when the AL of the candidate to be subjected to blind-decoding does not include 16 or 8, a non-nested structure may be applied. Alternatively, when the number of candidates with a specific AL is greater than or equal to a specific value, the UE/BS may assume that the nested structure is applied. For example, when for AL=16, the number of candidates for which the UE should perform blind-decoding is greater than 1 (alternatively, when for AL=8, the number of candidates for which the UE should perform blind-decoding is greater than 2), the UE/BS may assume that a parameter (or hashing function) for configuring the nested structure is applied.

It may be determined depending on the RS type used in the CORESET or search space set, whether or not the nested structure is applied. For example, in a CORESET or search space set to which the wideband RS is applied, the UE/BS may assume that the nested structure is not applied (since the channel estimation complexity does not increase significantly).

It may be determined, based on the BW of the CORESET, whether or not the nested structure is applied. When the BW of the CORESET is large, a nested structure may be needed to reduce channel estimation complexity. When the CORESET BW is small, there may occur a lot of resource overlaps between candidates even when the conventional hashing function is applied. Thus, the UE frequently reuses the channel estimation result. Therefore, when the CORESET BW is greater than the number of specific RBs, the UE/BS may assume that a parameter or hashing function for configuring the nested structure is applied.

Whether or not the nested structure is applied may be signaled to the UE by the network. The network may signal to the UE whether or not the nested structure is applied to each CORESET, using a UE-specific RRC signaling or a broadcast signal, in consideration of the UE distribution and the CORESET configuration. Alternatively, the BS may signal, to the UE, which application criterion among the plurality of nested structure application criteria as suggested above to be applied to determine whether the nested structure is applied.

It may be determined based on a CCE-to-REG mapping approach in the CORESET whether or not the nested structure is applied. For example, the UE/BS may determine, based on whether interleaving is applied, whether to use a nested structure or a non-nested structure. For example, in a localized mapping approach that the interleaving is not employed, the CCEs that constitute the candidate are localized. Thus, the nested structures may be easily configured. Therefore, in a case of the localized mapping approach, the nested structure is applied. In a case of a distributed mapping approach, a non-nested structure is applied. Such a nested structure application criterion may be defined in advance or may be indicated to the UE via a higher layer signaling, and the like by the BS.

It may be determined based on the search space type (or DCI format, RNTI) whether the nested structure is applied. For example, the UE/BS may use a non-nested structure for a search space set used as a CSS. The UE/BS may use a nested structure for a search space set used as a USS. Such a nested structure application criterion may be defined in advance or may be indicated to the UE via a higher layer signaling, and the like by the BS.

Further, when multiple CORESETs or search space sets overlap each other, a resource region to which the nested structure is applied may be determined according to the priority rules proposed above. For example, the UE may apply the nested structure to a CORESET with a high priority (or a low priority) to perform the blind-detection.

If the nested structure is applied differently according to the channel estimation complexity as described above, each UE may use a different hashing function, thereby complicating candidate scheduling of the network. Therefore, in one approach to solve the problem, it may be configured whether the nested structure is used in a 'slot set', 'search space set' or 'CORESET set'. In this case, the network may configure UEs sharing the corresponding slot/SS/CORESET to use the same hashing function.

In another example, when the channel estimation complexity is beyond the capability of a UE, the UE may first drop candidates that do not satisfy the nested structure. A candidate that does not satisfy the nested structure may be defined as described in, for example, Alt. 1 to Alt. 3.

Alt. 1: If any of REG bundles included in the candidate belongs to a candidate of an AL higher than the AL of the candidate, the candidate is defined as satisfying the nested structure, and otherwise, it is defined as not satisfying the nested structure.

Alt. 2: If any of the REG bundles included in the candidate belongs to a candidate of a highest AL, the candidate is defined as satisfying the nested structure, and otherwise, it is defined as not satisfying the nested structure.

Alt. 3: If any of the REG bundles included in the candidate belongs to a candidate of an AL different from the AL of the candidate, the candidate is defined as satisfying the nested structure, and otherwise, it is defined as not satisfying the nested structure.

The above definitions of the nested structure may also be applied to CCEs. For example, REG bundle may be replaced with CCE in the above description. For example, in Alt. 1, if any of CCEs included in the candidate belongs to a candidate of an AL higher than the AL of the candidate, the candidate may be defined as satisfying the nested structure, and otherwise, it may be defined as not satisfying the nested structure.

The UE may drop a candidate including a CCE that does not satisfy the nested structure. For example, the UE may drop the candidate only if none of CCEs in the candidate satisfy the nested structure, or if at least one of the CCEs in the candidates does not satisfy the nested structure.

When blind detection is selectively performed according to whether the nested structure is satisfied in this manner, the number of candidates for which the UE performs blind detection may be reduced. To compensate for the decrease in the number of candidates, as many candidates as the number of dropped candidates may be mapped successively to candidates that have not been dropped. For example, it is assumed that the UE starts monitoring in CCE 4 to monitor 4 candidates for AL=2, CCEs 4 and 5 do not satisfy the nested structure, and CCEs 6 to 11 satisfy the nested structure. Then, the 4 candidates of AL 2 monitored by the UE may be mapped successively to [CCEs 6-7], [CCEs 8-9], [CCEs 10-11], and [CCEs 12-13], respectively. In general, when a nested CCE is included, there is a high probability that the next CCE is also nested. Therefore, the use of this method may reduce the channel estimation complexity of the UE without reducing the number of blind detections of the UE. This may be understood as implicitly forming the nested structure without changing a hashing function.

<BD Selection Based on Maximum Number of BDs>

For different search space sets, different monitoring periodicities, different ALs, and/or different numbers of candidates for each AL may be configured. Accordingly, it may occur that the UE should perform many blind detections in a specific slot in which a plurality of search space sets overlap with each other in terms of their monitoring periodicities, while the UE should monitor only one search space set in another slot. Preferably, the UE performs blind detection for as many candidates as possible in a slot having a small number of search spaces or candidates to be monitored, for the scheduling flexibility of the network. However, the number of blind decodings that the UE should perform may exceed a maximum number of blind decodings in a slot in which different search space sets overlap with each other in terms of their monitoring periodicities.

To overcome the above problem, it is proposed that when the number of blind detections (e.g., the total number of candidates) exceeds a maximum number of blind detections per slot, the above proposed candidate selection rule is applied in an embodiment of the present disclosure. The UE may determine candidates for blind decoding in a corresponding slot in consideration of both of the maximum number of blind decodings and the maximum number of channel estimations.

For example, the number of candidates to be monitored by the UE may be determined based on a CORESET and search space set configuration for a specific slot in consideration of a predefined maximum number A of blind decodings and a predefined maximum number B of channel estimations. When the determined number of candidates is larger than the maximum number of blind decodings, the UE may determine candidates for blind decoding according to the above proposed method. The UE may then derive the number of channel estimations for the determined candidates. When the derived value exceeds the maximum number of channel estimations, the UE may filter the candidates again in the above proposed method.

<Counting Rule of Channel Estimates>

When the number of channel estimations that the UE needs to perform in a specific slot exceeds a predetermined threshold, a priority rule for determining a candidate for blind decoding in the slot has been proposed above. In this specification, a rule of calculating a channel estimation complexity is additionally proposed.

Obviously, the channel estimation complexity increases in proportion to the number of CCEs to be blind-decoded. However, in an embodiment of the present disclosure, an REG bundle size may further be considered in calculating the channel estimation complexity.

In the NR system, the UE may use a DMRS in channel estimation for PDCCH reception, and adopt mainly minimum mean squared error (MMSE)-based channel estimation for the channel estimation. Because the size of a matrix used for channel estimation is changed according to an REG bundle size in the MMSE-based channel estimation, the channel estimation complexity may increase exponentially with the REG bundle size. For example, regarding channel estimation for one CCE, when the REG bundle size is 2 REGs, the UE performs channel estimation for 2 REGs three times, whereas when the REG bundle size is 6 REGs, the channel estimation complexity is generally expected to increase 33 times.

Therefore, it is proposed in this specification that when the number of channel estimations is derived, a measure (e.g., the number of CCEs, the number of REG bundles, the number of REGs, or the like) representing the number of channel estimations is weighted according to the REG bundle size of each CORESET. For example, if the REG bundle size of CORESET A is 2, the number of CCEs to be blind-decoded in CORESET A is 10, the REG bundle size of CORESET B is 6, and the number of CCEs to be blind-decoded in CORESET B is 8 in a specific slot, the number of channel estimations may be calculated to be 10 for CORESET A and X*8 for CORESET B where X may be predefined or indicated by higher-layer signaling. The UE may compare the maximum number of channel estimations which is predefined or indicated by higher-layer signaling with the number of channel estimations in the corresponding slot (to which a weight associated with an REG bundle size is applied). If the number of actual channel estimations exceeds the maximum number of channel estimations, the UE may select actual candidates for blind decoding by applying the above proposed candidate selection method.

In counting a channel estimation complexity as proposed in the present disclosure, channel estimations of resources (e.g., REG, REG bundle, or CCE) overlapped between different candidates of the same CORESET may be counted as one channel estimation, and candidates belonging to different CORESETs may be counted separately, even though their resources overlap with each other.

Additionally, when a wideband RS is used (e.g., when a precoder granularity is larger than an REG bundle size in the frequency domain), a channel estimation weight for the wideband RS may be introduced in a corresponding CORESET. When the wideband RS is used, DFT-based channel estimation may be used to reduce the channel estimation complexity. In this case, a weight may be separately applied to the wideband RS to apply a common criterion with a CORESET using MMSE-based channel estimation. For example, if the number of candidates to be blind-decoded in a CORESET using a wideband RS is 10, and the number of channel estimations is 20 CCEs as a result of counting resources overlapped between candidates as 1 in the CORESET, the number of channel estimations may be derived as 20*M CCEs by applying a predefined weight M for the wideband RS. Herein, M may be defined differently depending on the BW of a CORESET.

For example, MMSE-based channel estimation using the DMRS may be expressed as Equation 1.

$$\hat{H}_{MMSE} = R_{hy} R_{yy}^{-1} y \quad \text{[Equation 1]}$$

In Equation 1, y represents a channel vector (in resources carrying an RS) estimated in the RS, $R_{hy}$ represents a cross-correlation matrix between resources corresponding to y and resources for which MMSE-based channel estimation is to be performed, and $R_{yy}$ represents an auto-correlation matrix between y and y. When the UE performs MMSE-based channel estimation for one REG, the (rows x columns) of the matrices $R_{hy}$ and $R^{-1}_{yy} y$ included in Equation 1 are (12×3), (3×3), and (3×1). If the REG bundle size is greater than 1, the (rows x columns) of the respective matrices are $\{(M*12)\times(M*3)), ((M*)\times(M*3)), (M*3)\times1)\}$, for an REG bundle size=M. When the matrix operation of Equation 1 is performed in consideration of the size of each matrix, the number of multiplication operations for each REG bundle size in one CCE is listed in Table 5. A multiplication for one CCE refers to a value obtained by multiplying the number of REG bundles per CCE by the channel estimation complexity of each REG bundle, considering that one CCE includes 6 REGs.

TABLE 5

| REG bundle size | $R_{hy}$ | $R^{-1}_{yy}$ | y | Number of multiplications |
|---|---|---|---|---|
| 2 | 24 × 6 matrix | 6 × 6 matrix | 6 × 1 matrix | 3024 |
| 3 | 36 × 9 matrix | 9 × 9 matrix | 9 × 1 matrix | 6480 |
| 6 | 72 × 18 matrix | 18 × 18 matrix | 18 × 1 matrix | 24624 |

As noted from Table 5, the number of multiplications required for channel estimation of one CCE varies according to an REG bundle size applied to the CCE. While a complexity caused by the inverse operation of a matrix or RS-based channel estimation is excluded in the analysis of Table 5, it is obvious that as the REG bundle size increases, the complexity also increases.

On the assumption that the complexity of a CCE with a bundle size of 2 is 1 in deriving a channel estimation complexity based on the above multiplications, the total complexity may be derived by assuming the complexities of a CCE with a bundle size of 3 and a CCE with a bundle size of 6 to be 2 and 8, respectively.

More specifically, a weight for the number of channel estimations may be determined according to whether time-domain channel estimation such as 1D-MMSE, 2D-MMSE, or the like is included.

Further, the weight for channel estimation may be a value determined according to an REG bundle size (e.g., M for an REG bundle size of ⅔ and 4*M for an REG bundle size of 6) or a value determined according to an REG bundle size in the frequency domain (e.g., M for an REG bundle size of ⅔ and 4*M for an REG bundle size of 6).

Alternatively, the network/UE may assume the same complexity in units of K REGs or in units of one CCE in consideration of a time taken for a pipeline for one channel estimation operation.

Alternatively, because the capability of a UE may be determined according to the capacity of a buffer storing a channel estimation output result, the network/UE may assume a different channel estimation complexity for a different precoder, for example, consider a different channel estimation result to be a different complexity value. For example, as a precoder granularity increases, the channel estimation complexity may decrease.

Alternatively, an MMSE calculation and a buffer requirement may be weighted in a combination of these methods.

Alternatively, the channel estimation complexity may be counted as the number of 'REG bundles' in the frequency domain or a multiple of 6. Alternatively, the channel estimation complexity may be more simply counted by a linear function of the number of RBs in a CORESET.

When blind decodings beyond a predefined limit for a channel estimation complexity are required for a UE, a dropping rule for selecting a candidate for which blind decoding is to be skipped has been proposed before. Now, an additional candidate dropping method is proposed below. Drop rules proposed in the present disclosure may be implemented alone or in combination.

The UE may determine how many candidates in which resource pool are to be dropped (or blind-decoded) based on the number of candidates per unit resource. When a plurality of search space sets are to be monitored in the same slot, the UE may select a candidate for which blind decoding is to be skipped, as follows.

The number of candidates to be skipped in each CORESET associated with each search space set or a corresponding search space set may be determined based on the ratio of the number of candidates (CCEs or REG bundles) to be monitored in the CORESET to the total number of candidates to be monitored. The UE may determine the numbers of candidates to be skipped in each CORESET and each search space set based on the ratio of the number of candidates configured in the CORESET or the search space set to the total number of candidates configured in an entire corresponding slot.

For example, it is assumed that 10 CCEs are to be monitored in search space set #0, 20 CCEs are to be monitored in search space set #1, and a channel estimation complexity-related limit predefined or indicated by higher-layer signaling is 20. In this case, as many candidates as 10 CCEs or more candidates than 10 CCEs should be skipped. The number of candidates to be dropped in each CORESET (or search space set) may be determined according to the ratio of the number of candidates allocated to the CORESET (or search space set) to the total number of candidates. For example, candidates associated with at least 10 CCEs should be dropped, and search space sets #0 and #1 occupy 66.6% and 33.3% of the total candidates, respectively. Candidates (or CCEs) may be dropped at 2:1 in search space sets #0 and #1. For example, if candidates to be dropped are determined, starting from a low AL, the UE may drop two AL1 candidates in search space set #0 in a predetermined order and one AL1 candidate in search space set #1 in a predetermined order. The UE may then repeat the above operation until the number of CCEs associated with candidates to be dropped is equal to or larger than 10. For example, the UE may determine candidates to be dropped in the order of AL2, AL4 and ALB, or when there is no more candidate to be dropped for AL1, the UE may drop an AL2 candidate.

As clarified before, the number of candidates (or CCEs) to be dropped in corresponding resources may be determined based on the number (or ratio) of candidates or CCEs per unit resource. Herein, the ratio may refer to the ratio of the number of candidates (or CCEs) in a specific resource unit (e.g., a CORESET, a search space set, or an AL) to the total number of candidates (or CCEs) configured for the UE in specific time resources (e.g., slot). This method may apply on a resource unit basis. For example, when blind decodings beyond the limit of a channel estimation complexity are configured in a specific slot, the UE may derive the number of candidates to be dropped in each CORESET based on the number of candidates for the CORESET in the slot or derive the number and order of candidates to be dropped for each AL based on the number of candidates for the AL in each CORESET.

Additionally, the REG bundle size of each CORESET may be used as a criterion for determining candidates to be dropped. As the REG bundle size increases, the channel estimation complexity increases. Therefore, when candidates are configured for the UE beyond the limit of the channel estimation complexity, it may be predefined or indicated by higher-layer signaling that the UE first drops candidates in a CORESET with a large REG bundle size.

In another method, candidates may be prioritized, and the UE may apply the prioritization rule to all candidates configured for blind decoding in corresponding time resources (e.g., slot) and skip blind decoding for low-priority candidates. All or a part of the above proposed factors may be considered in the prioritization. For example, the priorities of candidates may be predefined or defined by higher-layer signaling according to CORESETs, search space sets, ALs, CCE-to-REG mappings, RS types, search space types, or REG bundle sizes. The UE may determine the priority of each candidate and then skip blind decoding for candidates, starting from a lower-priority candidate until reaching the number of CCEs corresponding to the channel estimation complexity limit. As such, the priority of each candidate may be defined and determined based on the above proposals.

For example, a CORESET-related parameter $A_0$ may be defined. $A_0=0.5$ for CORESET #0 and $A_0=0.9$ for CORESET #1. A search space type-related parameter $A_1$ may be defined. For example, it may be predefined or indicated by higher-layer signaling that $A_1=1$ for a CSS and $A_1=0.5$ for a USS. Similarly, a different weight may be applied to each AL, and a weight may also be considered for application or non-application of the nested structure. Once m parameters are determined in this manner, the priority of each candidate may be expressed as $A_0*A_1* \ldots *A_{m-1}$. As this priority is lower (or higher), the candidate may have a higher priority.

<Skipping Method for Approaching BD/CCE Limit>

Since excessive blind decoding skip of the UE imposes a constraint on DCI scheduling of the network, an embodiment of the present disclosure proposes a method of determining a candidate to be skipped at a UE, when a channel estimation complexity limit is approached, to solve the problem. This method may be understood as a method of performing blind decoding and channel estimation approaching a maximum limit.

For example, when the number of CCEs for blind decoding configured for the UE exceeds a limit, the UE needs to drop a candidate. In this case, it is assumed that the difference between the limit and the number of CCEs for which actual blind decoding is to be performed is 1, and the AL of the next candidate to be skipped is AL16. If the UE skips an AL 16 candidate, the UE performs channel estimations fewer than the limit by 15 CCEs. This means that there is a limitation on network scheduling for the UE.

The following methods are proposed to solve this problem. The following methods may also be applied to a process of skipping blind decoding for a candidate. For example, the following proposals may be applied in the process of reducing the difference between the number of CCEs used for actual channel estimation and a limit by blind decoding skip.

Method 1) When the difference between the limit for the channel estimation complexity and the number of CCEs used for actual channel estimation is less than or equal to X, the UE may no longer skip blind decoding. Hence, the complexity problem may be solved simply, and there may be a disadvantage in that the scheduling opportunity for each UE may be set differently according to a prioritization rule performed for each UE.

Method 2) When the difference between the limit for the channel estimation complexity and the number of CCEs used for actual channel estimation is less than or equal to X, it may be predefined that the UE skips blind decoding only for a specific AL (e.g., AL1) or an AL for which the UE is supposed to skip blind decoding may be indicated by higher-layer signaling. Additionally, when the UE is supposed to skip blind decoding for a specific AL, corresponding AL candidates may be prioritized in the above proposed methods. Despite the benefit of the best utilization of a given limit for the channel estimation complexity, Method 2) decreases candidates for a specific AL, thereby reducing the resource utilization. In order to apply Method 2) more efficiently, the network may set a plurality of thresholds so that the UE may skip a candidate belonging to a different AL in each period corresponding to each threshold.

When the UE needs to determine a candidate to be skipped from among candidates of the same priority, the UE may determine a candidate to be skipped by a UE ID or the like, for randomization of different CORESETs and/or randomization of UEs. For example, the UE basically skips candidates, staring from a candidate having a low index. However, the index which the UE starts to skip may be set differently for each UE based on the UE ID.

<Hashing Function for CSS>

In the NR system, different search space sets may operate as CSSs according to the characteristics of transmission information. For example, a search space set for RNTI scheduling, a search space set for paging scheduling, a search space set for a random access procedure, and a search space set for a TPC command, SI RNTI, or the like may have different configurations. For example, an NR technical specification, TS 38.213 defines search space types as listed in Table 6.

To solve this problem, an embodiment of the present disclosure proposes that a different $Y_{p,kp}$ value is defined for each CSS type (or each RNTI used for monitoring in a CSS, or each monitoring periodicity). For example, the index of a CSS type may be defined as a $Y_{p,kp}$ value (e.g., $Y_{p,kp}=0$ for Type0, and $Y_{p,kp}=1$ for Type1).

<Method of Calculating Channel Estimation Complexity in CORESET Using Wideband RS>

A method of calculating a channel estimation complexity proportional to a CORESET BW for a CORESET using a wideband RS has been proposed before. In the method, the channel estimation complexity may be determined based on the BW and duration of the CORESET configured with the wideband RS.

For example, the network/UE may add a weight according to the BW of an actual CORESET, on the assumption that the channel estimation complexity of a specific CORESET BW (e.g., 24 RBs) configured with a wideband RS is X CCEs. For example, if the BW of CORESET "A" is Y RBs, and the channel estimation complexity for 24 RBs is 10 CCEs, the network/UE may calculate the channel estimation complexity of CORESET "A" to 10*Y/24, Floor (10*Y/24), or Ceiling (10*Y/24). Floor (10*Y/24) represents the largest integer less than or equal to 10*Y/24, and Ceiling (10*Y/24) represents the smallest integer equal to or larger than 10*Y/24.

This may be understood as predefining the complexity of a reference BW in the frequency domain and determining the actual channel estimation complexity by the ratio between the BW of the CORESET and the reference BW in order to obtain the channel estimation complexity of the CORESET using the wideband RS.

Additionally, the duration of the CORESET (i.e., the number of OFDM symbols in the CORESET) may be considered for the channel estimation complexity. For example, the above method may mean the channel estimation complexity for each symbol of the corresponding CORESET, and the channel estimation complexity of the entire CORESET may be a value obtained by multiplying the complexity calculated above by the number of OFDM symbols. For example, a reference duration for a channel estimation complexity may be set in the time domain, and the actual channel estimation complexity may be determined by a ratio between an actual CORESET duration and the reference duration.

TABLE 6

- a Type0-PDCCH common search space for a DCI format with CRC scrambled by a SI-RNTI on a primary cell;
- a Type0A-PDCCH common search space for a DCI format with CRC scrambled by a SI-RNTI on a primary cell;
- a Type1-PDCCH common search space for a DCI format with CRC scrambled by a RA-RNTI, or a TC-RNTI, or a C-RNTI on a primary cell;
- a Type2-PDCCH common search space for a DCI format with CRC scrambled by a P-RNTI on a primary cell;
- a Type3-PDCCH common search space for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI(s); and
- a UE-specific search space for a DCI format with CRC scrambled by C-RNTI or CS-RNTI(s).

The current NR standard defines the initial value of the hashing function for this CSS set as 0 (i.e., $Y_{p,kp}=0$). According to the NR standard, when different CSS sets are configured in the same CORESET in the same slot, blocking may increase, and scheduling flexibility may decrease.

For example, when a wideband RS is used, X (e.g., 1) symbol & Y (e.g., 24) RBs are predefined as a reference configuration, and the complexity of the reference configuration is predefined as Z (e.g., 10) CCEs. The UE may then derive the channel estimation complexity of the corresponding CORESET to be blind-decoded according to the configuration (e.g., BW or duration) of the CORESET.

Further, when a plurality of search space sets overlapping with each other in a CORESET using a wideband RS in a specific slot are to be monitored, preferably, the channel estimation complexity is not counted redundantly. Accordingly, when a plurality of search space sets are monitored in the same CORESET in one slot, and the corresponding CORESET uses a wideband RS, it is proposed that the number of CCEs derived for the CORESET is counted only once in the channel estimation complexity. For example, when a specific CORESET A is configured with a wideband RS, and search space sets A and B are associated with CORESET A, the total channel estimation complexity of search space sets A and B may be derived by applying the complexity calculated for CORESET A only once in a slot where monitoring occasions of search space sets A and B overlap with each other.

Additionally, the number of wideband RS CORESETs per slot may be limited as a method of handling the channel estimation complexity of a CORESET using a wideband RS, and CCE/blind decoding may be counted and blind decoding may be dropped, only in consideration of the channel estimation complexity of a narrowband RS CORESET in a corresponding slot. When a wideband RS is used, DFT-based channel estimation may be used as a channel estimation technique, and it may be difficult to compare the absolute complexities of MMSE-based channel estimation and DFT-based channel estimation commonly used in a CORESET using a narrowband RS. Therefore, it may be preferable to limit the number of wideband RS CORESETs without additionally calculating the channel estimation complexity of a wideband RS CORESET.

For example, the UE may assume that there are as many wideband RS CORESETs as a number (e.g., 1) per slot predefined or indicated by higher-layer signaling. Alternatively, if the number of wideband RS CORESETs to be blind-decoded in a specific slot is greater than the number predefined or indicated by higher-layer signaling, the UE may select a wideband CORESET to be blind-decoded. The foregoing proposed methods may be used to select a CORESET.

In another method, when the number of wideband CORESETs to be blind-decoded in a specific slot exceeds a specific value, the network/UE may derive the number of blind decodings and the number of CCEs by the above proposed method. When the limits on the number of blind decodings and the number of CCEs are exceeded, blind decoding may be dropped by the above proposed method. For example, when search space set A associated with a wideband RS CORESET and search space set B associated with a narrowband RS CORESET are simultaneously monitored in a specific slot, the UE may count the number of CCEs corresponding to the channel estimation complexity of search space set B. When the counted number of CCEs exceeds the limit, the network/UE may select a candidate to be dropped using the above proposed method. Herein, the network/UE may assume that candidates in the wideband RS CORESET have higher priorities or are not skipped. Since the limit on the maximum number of blind decodings is determined in consideration of a processing time for decoding, it may be desirable for the network/UE to determine whether the limit has been exceeded in consideration of all of candidates to be monitored in the wideband RS CORESET and the narrowband RS CORESET.

<Method of Deriving Channel Estimation Complexity in Consideration of REG Bundle Size>

It has been proposed above that when a narrow RS is used, an actual channel estimation complexity is derived by applying a weight corresponding to an REG bundle size to the number of CCEs derived from each CORESET.

In an embodiment of the present disclosure, a channel estimation complexity limit may be defined based on a specific REG bundle size. For example, it may be predefined that all UEs are capable of performing channel estimation on at least 48 CCEs in a given slot. 48 CCEs may result from assuming an REG bundle size of 6 REGs. It is also possible to set a reference REG bundle size to 2 or 3 REGs.

In this case, the UE may operate as follows.

Option 1) The channel estimation complexity of each CORESET is calculated with respect to the reference REG bundle size (the above proposed method).

When monitoring a plurality of CORESETs in a specific slot, the UE may calculate the total channel estimation complexity of the slot by calculating the channel estimation complexity of each CORESET with respect to the reference REG bundle size. To this end, a weight for each REG bundle size may be predefined.

Option 2) A channel estimation complexity is derived irrespective of an REG bundle size.

The UE may derive the channel estimation complexity (e.g., the number of CCEs) of each CORESET irrespective of an REG bundle size and compare the total number of CCEs in a corresponding slot (e.g., the number of CCEs defined based on a reference REG bundle size) with a channel estimation complexity limit, thereby determining whether to drop a candidate. In this case, the channel estimation complexity limit is preferably defined based on an REG bundle size of 6. In this case, when CORESETs with an REG bundle size of 2 or 3 overlap with each other in the same slot, it may be guaranteed that the channel estimation complexity does not exceed the channel estimation capability of the UE. On the other hand, when the reference REG bundle size is set to 2, channel estimation beyond the channel estimation capability of the UE may be required in a slot in which a CORESET with an REG bundle size of 3 or 6 is monitored. As a result, the performance or processing time of the UE may not be satisfied. When the reference REG bundle size is set to 2 or 3 as such, the UE/network may assume that a CORSET with a small REG bundle size has a high priority in a candidate drop rule. For example, the network/UE may first drop a candidate in a CORESET with a large REG bundle size.

Additionally, an REG bundle size may be additionally considered in Example 1) CORESET priority in the above proposed prioritization. For example, a CORESET with a large REG bundle size may have a low priority and thus may first be dropped.

<Maximum Number of BDs>

A maximum number of blind decodings to be performed in one slot may be defined for each SCS. For example, the maximum number of blind decodings may be set to 44 for a 15-kHz SCS.

As is the case with a channel estimation complexity, blind decodings beyond the blind decoding limit of the UE may be configured in a specific slot by a plurality of search space set configurations. To prevent this situation, the UE may assume that blind decodings are not configured beyond the maximum blind decoding limit at all. However, this may act as a factor decreasing the resource utilization of the network. For example, it may occur that 10 search space sets are to be monitored overlappingly in a specific slot. Therefore, the network may have to configure a small number of blind decodings in a slot in which search space sets overlap less with each other, to prevent the limit from being exceeded. Since this may seriously impair the scheduling flexibility of the network, overbooking may be allowed in a specific slot and specific blind decodings may be skipped in the slot.

For this operation, a method of counting the number of blind decodings in each slot is proposed. A decoding procedure occupies a major proportion of the complexity of blind decoding. After performing decoding only once for the same payload size, the UE may distinguish different DCIs by a DCI format indicator included in a specific field of the DCIs. Therefore, the following may be assumed in counting the number of blind decodings.

- The UE counts candidates of different CORESETs as independent blind decodings.
- The UE counts candidates which belong to the same CORESET but have different ALs as independent blind decodings.
- The UE counts candidates which belong to the same AL of the same CORESET but have different CCE configurations as independent blind decodings.
- The UE counts candidates which belong to the same CORESET, AL, and CCE configuration but have different DCI formats as independent blind decodings.

For example, the UE may count candidates identical in terms of CORESET, AL, and CCEs (despite different search space sets) as one blind decoding.

<Method of Selecting Candidate to Reduce Blind Decodings>

The rule of counting the number of blind decodings has been proposed above. Now, a method of configuring candidates in each search space set to allow a UE to perform more blind decodings will be proposed below.

According to the conventional method, when the UE configures candidates for a specific search space set in a specific CORESET, the UE should follow a hashing function defined in the standard. In this case, when a different number of candidates are defined in each search space set, the candidates of each search space set have a different CCE configuration. Even if the DCI format size is the same, since the candidates have different CCEs, the UE should perform blind decoding independently for each candidate, which may increase the number of blind decodings.

Accordingly, in one embodiment of the present disclosure, when there are a plurality of search space sets associated with the same CORESET, it may be signaled to the UE or determined according to a predefined rule whether another search space set follows the hashing function of a specific search space set.

For example, it is assumed that the monitoring occasions of search space set A associated with CORESET A and search space set B associated with CORESET B overlap with each other in a specific slot, and the size of a DCI format to be monitored is the same in search space set A and search space set B. In this case, the hashing function of a search space set with a larger number of candidates for a specific AL may be reused for a search space set with a smaller number of candidates. For example, it is assumed that candidates for AL2 are 0, 1, 2, and 3 for search space set A and 0 and 1 for search space set B. The UE may assume that candidates 0 and 2 of search space set A and candidates 0 and 1 of search space set B share resources, or the network may signal to the UE which candidates share resources.

Additionally, the network may indicate to the UE to follow a large DCI format size for search space sets configured for monitoring different DCI format sizes. For example, it is assumed that the UE monitors DCI having a DCI format size of 100 bits in search space set A, and DCI having a DCI format size of 80 bits in search space set B. The network may indicate to the UE to assume a DCI format size of 100 bits for search space set B (in slot(s) over which the monitoring occasions of the two search space sets overlap with each other). The remaining 20 bits may be defined using a specific pattern (e.g., zero padding). Such a configuration may be set in units of specific slot(s), a CORESET, or a search space set. For example, if the network configures assumption of the same DCI format size for a specific CORESET, and a plurality of search space sets are associated with the corresponding CORESET in a specific slot, the UE may assume the DCI format size of a search space set having the largest DCI format size for other search space sets.

The above operation may be defined on a DCI format basis or on an RNTI basis. For example, a UE configured to assume the same DCI format size for an interruption (INT)-RNTI and a configured scheduling (CS)-RNTI may perform blind decoding, assuming that the DCI format size of an RNTI corresponding to a smaller value among DCI format sizes set for the respective RNTIs to be the same as the DCI format size of an RNTI corresponding to a large value. However, the same DCI format size may be assumed only when two search space sets are monitored in the same slot and associated with the same CORESET.

The counting methods related to channel estimation complexity and blind decoding and the methods of dropping a candidate, when a limit is exceeded, have been proposed above. The proposed methods may be implemented into the following embodiments.

Embodiment 1

When a channel estimation complexity limit is exceeded in a specific slot, the network/UE may assign a higher priority to a CSS and preferentially drop a candidate in a USS.

- A default candidate may be configured for each AL of each USS and/or a CSS having the same priority as the USS. For example, the default candidate may be a candidate having the lowest (or highest) index among the candidates of the AL. Alternatively, the default candidate may be configured based on a UE ID. To prevent multiple UEs from configuring the same candidate as a default candidate, the default candidate may be determined, for example, by (UE ID) mod (the number of candidates in the AL).

Alternatively, only one default candidate may be configured for each search space set. For example, one candidate of AL 16 or a highest AL configured for a corresponding search space may be configured as a default candidate.
- The network/UE may preferentially drop a non-overlapping candidate among candidates allocated to a USS in a corresponding slot. In the presence of many non-overlapping candidates, a candidate of a lower (or higher) AL may be dropped preferentially.
- The network/UE may drop candidates, starting from a candidate of a lower AL in a USS and/or a CSS having the same priority as the USS. This operation may be as close as possible to the channel estimation complexity limit and ensure a coding rate for a UE at a cell edge. For example, this method may be used to prevent waste of a channel estimation capability which might otherwise be caused by candidate dropping.

The network/UE may drop candidates, starting from a lower index, while maintaining a default candidate. Alternatively, the network/UE may set a cyclic shift value for candidate dropping based on a UE ID, while maintaining a default candidate. Accordingly, the index of the first candidate to be dropped may be set differently for each UE.

The network/UE may drop candidates, starting from a USS for non-fallback DCI. USSs may be prioritized. For example, the USSs may be prioritized based on CCE-to-REG mapping and fallback/non-fallback.

When the channel estimation complexity exceeds the limit even after candidates of the USS are dropped, the network/UE may drop a CSS candidate. CSSs may be prioritized according to RNTIs (or DCI formats). Candidates may be dropped, starting from a candidate with a lower index in a lower-priority CSS, or a cyclic shift value may be set based on a UE ID.

When a condition related to overlap or non-overlap is not applied in the above process, for example, when the network/UE determines whether to drop a candidate based on the index of a resource unit (e.g., candidate), it may occur that a candidate fully overlapping with another candidate is dropped. As a result, only the number of blind decodings may be reduced without any decrease in the channel estimation complexity.

In an embodiment of the present disclosure, therefore, it is proposed that when a candidate is dropped without applying a condition related to overlap or non-overlap, a candidate configured only with CCEs included in finally selected candidates is blind-decoded among dropped candidates after the dropping procedure. That is, it is proposed that dropping of a candidate that does not affect the channel estimation complexity as a result of candidate dropping is canceled and blind-decoded.

Embodiment 2

An example of determining a candidate to be dropped from among total candidates has been described above. On the contrary, a method of selecting a candidate to be blind-decoded from among total candidates may also be performed.

A default candidate may be configured for each search space. This operation may be intended to enable the UE to blind-decode all CORESETs and/or all search space sets.

The UE may blind-decode search spaces in a descending order of priorities.

The network/UE may set candidates to be blind-decoded, starting from a candidate with a higher overlap degree. Then, the network/UE may set a candidate overlapping with a previous selected candidate as a candidate to be blind-decoded in a corresponding search space.

Alternatively, the network/UE may add candidates one by one, while increasing an AL in each search space set.

The above procedure may be performed until the channel estimation complexity limit is satisfied. When the channel estimation complexity limit is reached, the above procedure may be terminated. After terminating the above procedure, the network/UE may additionally select candidates which have not been selected for blind decoding as blind-decoding candidates from among candidates fully overlapping with the candidates selected for blind decoding. Because the additional candidates fully overlap with the existing candidates, the additional candidates may not increase the channel estimation complexity and increase the number of candidates, thereby increasing the scheduling flexibility of the network.

The above proposed method of skipping a candidate may be reused in relation to the candidate selection rule in Embodiment 2. While the following description is given mainly of exemplary priorities of search space types, search spaces, ALs, and candidates, the above-proposed priorities of time/frequency resources, overlaps, CORESETs, and default candidates may also be used in selecting candidates.

For example, when the network/UE selects a candidate from a specific search space set based on the priority of the search space set, the network/UE may determine an AL for a candidate to be selected preferentially based on the priority of the AL. In another example, the network/UE may select one candidate for each AL in a corresponding search space set. For example, the network/UE may select candidates in the order of higher AL to lower AL, and select a candidate of a lower index in each AL as a candidate to be blind-decoded.

More specifically, it is assumed that for a specific numerology (e.g., a 15-kHz SCS), the maximum number of blind decodings is X and the maximum number of CCEs for a channel estimation complexity is Y, for each UE. A UE using the specific numerology may determine (X−X1) and (Y−Y1) to be the number of blind decodings and the number of CCEs, which are allocated to a UCC in a corresponding slot, wherein X1 is the number of blind decodings set for a search space set configured as CSSs and Y1 is the number of channel estimations (e.g., the number of CCEs) for a corresponding blind decoding. The UE may select a candidate, and additionally calculating (X−X1) and (Y−Y1).

The following options may be available in selecting candidates to be blind-decoded.

Option 1) Method of Filling Candidates for ALs, Starting from Specific AL

The network/UE may define the priority of each AL and select candidates to be blind-decoded, starting from a candidate of a higher-priority AL. ALs may be prioritized in the above proposed method (e.g. a higher priority is assigned to a higher (or lower) AL or ALs are prioritized by the network). For example, when a higher priority is assigned to a higher AL and 4, 4, 2, and 2 candidates are configured respectively for ALs 1, 2, 4 and 8, the UE may select candidates to be blind-decoded, starting from a candidate of a higher-priority AL within a range that does not exceed the blind decoding limit (e.g., X−X1) and/or the channel estimation limit (e.g., Y−Y1).

For the same AL, the UE may select a candidate according to the priority of the candidate. In the same AL, the candidates may be prioritized in the above proposed method (e.g., a higher priority is assigned to a candidate with a higher (lower) index or candidates are prioritized by the network).

For example, it is assumed that the network/UE selects candidates from search space set #1 configured as USSs and 4, 4, 2, and 2 candidates are configured for ALs 1, 2, 4 and 8, respectively in search space set #1. The UE may then select candidates from the search space set in the order of AL8 candidate #0→AL8 candidate #1→AL4 candidate #0→AL4 candidate #1→AL2 candidate #0→ . . . →AL2 candidate #3→AL1 candidate #0→ . . . →AL1 candidate #3.

In the above embodiment, a candidate occupying more CCEs (e.g., a candidate for a higher AL) is preferentially selected. Therefore, this method may be useful along with the method of adding a fully overlapped candidate after a candidate selection procedure. This method may guarantee as wide coverage as possible for the UE.

On the contrary, when a higher priority is assigned to a lower AL, the UE may blind-decode more candidates, thereby ensuring the scheduling flexibility of the network. However, UEs in a poor channel environment may have an increased probability of decoding failure in view of lack of a coding gain.

While the method of selecting candidates in an index order has been described above, if all UEs using the same CORESET select candidates by applying the same priorities to the candidates, resources may be used inefficiently. Accordingly, the UEs may be configured to select different candidates. For example, the index of the first candidate to be selected may be determined based on a UE ID. For example, when there are four candidates for a corresponding AL, the index of the first candidate to be selected may be determined by (UE ID mod (4)). Similarly, the starting index may be derived by (search space set ID and/or CORESET ID mod the number of candidates).

In another method, a hopping pattern may be introduced to a candidate selection order. For example, the network/UE may select candidates, starting from a lower one of even-numbered indexes, and upon completion of candidate selection for the even-numbered indexes, select candidates, starting from a lower one of odd-numbered indexes.

Option 2) Method of Selecting One Candidate for Each AL at Each Time

In a method of increasing the decoding probability of the UE and the scheduling flexibility of the network, the network/UE may select a candidate, while changing from one AL to another AL. For example, when 4, 4, 2 and 2 candidates are configured for ALs 1, 2, 4 and 8, respectively, candidates may be selected in the order of AL8 candidate #0→AL4 candidate#0→AL2 candidate#0→AL1 candidate#0→AL8 candidate#1→AL4 candidate#1→AL2 candidate#1→AL1 candidate#1→AL2 candidate#2→AL1 candidate#2→AL2 candidate#3→AL1 candidate#3. Although it is assumed that a higher priority is assigned to each of a higher AL and a lower index in this example, the opposite case is also possible, in which a higher priority is assigned to each of a lower AL and a higher index.

When candidates are selected in this manner, the UE performs blind decoding uniformly for the candidates of the respective ALs. Therefore, scheduling may be performed adaptively according to the channel environment of each UE and resources may be used more efficiently.

Similarly to option 1), candidates may be selected from the same CORESET (the same search space and/or the same AL) by applying a UE ID (a search space set ID or a CORSET ID) or a hopping pattern in option 2.

In the presence of multiple USSs, the network/UE may repeat the above operation for the USSs, starting from a USS with a higher-priority index according to the priorities of the USSs. For example, the network/UE may first select a candidate from a specific USS with a higher priority. When a blind decoding/channel estimation budget is still available after all candidates of all ALs are selected, the UE may select a candidate from the next USS. In this case, more candidates are assigned to a specific search space set with a higher priority, thereby ensuring scheduling flexibility. Despite this benefit, a candidate in a search space set with a lower priority may not be transmitted in a corresponding slot.

Alternatively, in the presence of multiple USSs, the network/UE may select one candidate from each of the USSs at each time according to the above process. For example, the network/UE may select one candidate from a higher-priority USS according to the priorities of the USSs, and then the next candidate from a USS of the next priority.

In this case, candidates of as many search space sets as possible are blind-decoded. However, the scheduling flexibility is reduced in each search space set. When there are multiple USSs but all the USSs may share candidates, or when a specific USS is included in another USS, the above method may be applied without selecting a candidate from each USS.

Additionally, when there are multiple USSs, the USSs may be prioritized according to CORSETs. For example, a USS configured in a CORESET including a CSS (or a USS in the same monitoring occasion as a CSS that the UE should monitor) (in a slot to be monitored) may have a higher priority. For example, the CSS may include a candidate selected in the slot. This is because candidates of the USS overlap with candidates of the CSS in many cases and thus more candidates may be selected from the USS than from other USSs.

Additionally, the above proposed method may also be applied to the CSS. For example, CSSs may be prioritized and candidates may be selected according to the priorities of the CSSs. As mentioned above, various types of information are transmitted to a UE in CSSs, which may be distinguished by RNTIs and/or CSS types. This may mean that CSSs with various monitoring periodicities may exist and the priorities of the CSSs may be determined according to information delivered in the CSSs.

For example, the priority of a CSS may be determined by an RNTI, a CSS type, and/or a periodicity. For example, the UE may always blind-decode a candidate related to a specific RNTI or a specific CSS type. For example, corresponding candidates may be included in the afore-described X1 and Y1. Then, CSSs with lower priorities may be determined along with USSs.

In another method, some of candidates corresponding to the total blind decoding limit X and the channel estimation limit Y may be allocated to a CSS, and the remaining candidates may be allocated to a USS. The numbers of candidates allocated to the CSS and the USS may be determined according to a predefined ratio or indicated through higher-layer signaling by the network. Subsequently, candidates may be selected in the above proposed method according to the number of candidates (e.g., XCSS, XUSS, YCSS, or YUSS) allocated for each search space set (or AL).

In the above proposed methods, when at least one of X and Y is exceeded, the network/UE may discontinue candidate selection. Alternatively, the network/UE may select additional candidates within a range that does not increase the number of blind decodings or the number of channel estimation CCEs reaching the limit, for more blind decodings and more CCE channel estimations. For example, when the number of CCEs has reached the limit but the number of blind decodings has not reached the limit, the network/UE may select additional candidates only from among candidates fully overlapping with the CCEs occupied by the selected candidates, as proposed before. On the contrary, when the blind decoding limit is first reached and there is any candidate whose blind decoding is counted as the same blind decoding as an already selected candidate, the network/UE may select/add the candidate. For example, a candidate having a DCI format and/or an RNTI different from that of an already selected candidate but the same DCI format size as that of the already selected candidate may be added. This may imply that when a candidate selected from a specific search space set is identical to a candidate of another search space set and DCI formats monitored in the search space sets are of the same size, the candidates of the search space sets may be blind-decoded irrespective of the blind decoding limit and/or the channel estimation limit for the corresponding candidates.

The following STEP 1 to STEP 4 are for another embodiment of the candidate selection process. All or a part of STEP 1 to STEP 4 may be used in the candidate selection process. For example, candidate selection may be discontinued after the process proceeds to STEP 3. Further, the afore-proposed various methods may be used in determining priorities. For example, the number of overlapping CCEs may be used as a priority rule for candidate selection, and the numbers of candidates belonging to search spaces and/or ALs may be used (e.g., a higher priority may be assigned to a search space and/or an AL having a smaller number of candidates).

Assumption: Blind decoding limit=$X$ and channel estimation limit=$Y$ (CCEs)

STEP 1: Selection of candidate from CSS ($X_{USS}$=$X$−$X_{CSS}$ and $Y_{USS}$=$Y$−$Y_{CSS}$)

When $X_{USS}$ or $Y_{USS}$ is smaller than 0, the network/UE performs candidate selection for a CSS. If there are a plurality of CSSs, the following options (i), (ii), and (iii) are available in prioritizing the CSSs.

(i) Search space set indexes (e.g., a higher priority for a lower index)

(ii) RNTIs (e.g., SFI (higher priority)→pre-emption-→paging→ . . . →TPC)

(iii) The network/UE may assume that none of the limits are exceeded for the CSSs. For example, the UE may assume that the blind decoding limit and the channel estimation limit are not exceeded just with the CSSs by network scheduling.

STEP 2: When $X_{USS}$ and $Y_{USS}$>0

When there are multiple USSs, a higher priority may be assigned to a USS with a lower index or a USS using the same CORSET as a CSS.

In a USS, the network/UE may select one candidate for each AL, while changing from one AL to another AL. A higher priority may be assigned to a higher AL. For the same AL, a candidate with a lower index may have a higher priority.

$X_{USS}$ and $Y_{USS}$ are subtracted by the selected candidate.

Regarding $X_{USS}$, when blind-decoding of a candidate is accepted as one blind decoding according to the afore-mentioned blind decoding counting rule, $X_{USS}$=$X_{USS}$−1

The number of CCEs which do not overlap with other candidates in the same CORESET (and the same monitoring occasion) may be subtracted from $Y_{USS}$ according to the afore-mentioned CCE counting rule. $Y_{USS}$=$Y_{USS}$−(number of non-overlapping CCEs in selected candidate).

STEP 3: STEP 2 is repeated, when both of $X_{USS}$ and $Y_{USS}$ are larger than 0.

When $X_{USS}$ becomes 0 due to the candidate selected in STEP 2, the network/UE performs STEP 4. When $Y_{USS}$ becomes 0 due to the candidate selected in STEP 2, the network/UE may also perform STEP 4. Alternatively, when $Y_{USS}$ becomes smaller than 0 due to the candidate selected in STEP 2, the network/UE may perform STEP 4, canceling the selection of the candidate.

STEP 4: When $X_{USS}$ is larger than 0 as a result of STEP 3, an operation of additionally selecting a candidate fully overlapping with occupied CCEs among dropped or unselected candidates (in each CORSET) may be repeated as far as $X_{USS}$ is larger than 0.

Priorities for selecting additional candidates may be determined according to the afore-proposed methods.

If only $Y_{USS}$ is larger than 0, the network/UE may select no more candidates, or repeat an operation of updating $Y_{USS}$ to $Y_{USS}$−(number of non-overlapping CCEs in selected candidate), while adding a candidate using the same resources and having the same DCI format size as the already selected candidates, and belonging to a different search space set (a different RNTI and/or a different DCI format) from those of the already selected candidates, from among unselected candidates. $X_{USS}$ is not changed.

It is proposed that when the UE does not blind-decode a specific candidate for some reason, the specific candidate is excluded from blind decoding counting and CCE counting for a channel estimation complexity. For example, when a CORSET to be monitored overlaps with a synchronization signal block (SSB) in a specific slot, the UE may not monitor a candidate fully or partially overlapping with the SSB among candidates to be monitored. Therefore, the network/UE may not count the candidate and CCEs related to the candidate, when counting the number of blind decodings and the number of CCEs in the specific slot. This may imply that a candidate which is not monitored is first excluded before a candidate selection or skip operation. In other words, the UE counts blind decodings and CCEs by excluding a candidate which is not monitored due to overlap with an SSB (or rate matching resources) among candidates configured to be monitored in a specific slot. When the blind decoding and CCE values exceed the limits, the UE may perform the above proposed candidate skip operation. Alternatively, the UE may select candidates from among the remaining candidates, while excluding candidates which are not monitored for various reasons.

In the case where when a candidate overlaps with other resources (e.g., an SSB or configured rate matching resources), the overlapped resources are punctured instead of dropping the candidate, the candidate may be subject to candidate skip/selection. In this case, besides the afore-proposed priority rules, the amount of punctured resources may be used as another priority rule. When much of resources included in the candidate are punctured, the decoding performance of the candidate may be degraded significantly. Accordingly, a candidate with much punctured resources may be assigned a lower priority. For example, the candidate with much punctured resources may be skipped preferentially. Similarly, a candidate with less punctured resources may be selected preferentially. This rule may be applied in conjunction with other priority rules. For example, when multiple candidates have the same priority according to different criterions, a candidate with much overlapping resources may be assigned a lower priority.

Embodiment 3

The nested structure may be considered in another method of reducing the channel estimation complexity. The nested structure refers to a structure in which a candidate of a lower AL is included in a candidate of a higher AL. With the use of the nested structure, dropping a candidate of a lower AL may not reduce the channel estimation complexity.

Therefore, the network/UE may select a candidate to be dropped in the following method.

Because a candidate of a lower AL may overlap with a candidate of a higher AL in the nested structure, dropping the candidate of the lower AL may be meaningless in terms of reduction of the channel estimation complexity.

Accordingly, the network/UE may first drop a candidate of a highest AL and then a candidate of the second highest AL overlapping with the candidate of the highest AL. In this manner, the network/UE may drop candidates. Alternatively, the network/UE may first drop a candidate of a highest AL in each search space set and then a candidate of the second highest AL in the search space set.

A search space set subjected to candidate dropping may be determined according to its priority. For example, candidate dropping may start from a USS and/or a CSS of a similar priority to that of the USS.

Some of the afore-described dropping rules, for example, default candidates and the priorities of CORSETs/search space sets may be applied.

Because it may not be preferable to drop a whole search space set, the network/UE may drop a candidate of a highest AL in each search space set in a round-robin manner. For example, candidates may be dropped in the order of candidate 1 of a highest AL in search space set 1, candidate 2 of a second highest AL included in dropped AL candidate 1 in search space set 1, . . . , a candidate of a lowest AL included in dropped AL candidate 1/2 in search space set 1, and a candidate of a highest AL in search space set 2. Candidates may be dropped in the order of candidate indexes (or cyclic shifts) at the same AL.

When Embodiment 3 is applied to the nested structure of Embodiment 2, candidates may be dropped as described in Table 7.

overlapping) CCEs in a CSS from the channel estimation complexity limit, and thus may refer to a channel estimation limit for the USSs.

Alternatively, the network/UE may designate a candidate for a lower AL among CCEs of the selected candidate. Then, the network/UE may repeat the same operation for another highest AL until the channel estimation complexity limit is reached.

In this process, when the number of CCEs in a candidate of a highest AL (which do not overlap with CCEs used in the previous process) exceeds the remaining channel estimation budget, the network/UE may repeat the operation of adding a candidate until the channel estimation limit is reached, by performing the above operation for a candidate of a lower AL.

When a candidate of a higher AL is determined, the number of candidates of a lower AL in a nested structure formed based on the determined candidate may be proportional to the number of CCEs in the candidate of the higher AL, or a value obtained by dividing the number of candidates configured for the lower AL by the number of candidates configured for the higher AL may be determined to be the number of candidates of the lower AL.

In a structure other than the nested structure, the following operation may be performed in step 2 of Table 7.

TABLE 7

The "X" means a limit of channel estimation complexity
In case nested structure is used,
  - If there is at least one CSS in a slot, reserve at least one USS candidate with non-fallback
    DCI (if UL/DL grant is monitored in different SS, two candidates are reserved)
    ■ Remaining budget X1 = X – reserved CCEs
  - If CCEs for CSS is less than X1
    ■ Remaining budget X2 = X1 – CCEs in CSS
  - Otherwise
    ■ Dropping procedure is applied to a CSS similar to USS. (if there are multiple CSS,
      dropping procedure is applied to a CSS which has lower priority.)
  - If X2 > 0 (step2),
    ■ Ascending order of 'highest AL' candidate as {candidate index, SS index} (e.g., {0,
      0}, {0, 1}, {0, 2}, ...) among all USS in the slot
    ■ For each candidate K from the above set (step3),
      ◆ If X2 >= # CCEs of K (i.e., K can be included in the remaining budget)
        ● Select K & lower AL candidates overlapping with K
        ● X2 = X2 – CCEs in K
      ◆ If X2 < K
        ● Drop K
        ● For each candidate K2 of the next AL overlapping with K,
          ■ If X2 > # CCEs of K2
            ◆ Select K2 & lower AL candidates overlapping with K2
          ■ Otherwise,
            ◆ For each candidate K3 of the next AL overlapping with K2
              ● Accept candidate & lower AL candidates overlapping with the
                selected candidate if the budget is not exceeded
              ● Otherwise, go to the next lower AL until there is no AL
      ◆ Go to next candidate (i.e., next highest AL candidate)

The above description is summarized: when the nested structure is used, default candidates are defined in for USSs. When the sum of the channel estimation complexity of the default candidates and the channel estimation complexity of candidates included in CSSs does not exceed a limit, the network/UE may select one of candidates of a highest AL in a higher-priority USS. When the number of non-overlapping CCEs in the selected candidate is smaller than a channel estimation budget, the selected candidate and candidates of lower ALs overlapping with the selected candidate are selected for blind decoding. The channel estimation budget is calculated by subtracting the number of used (non- For each AL, the number of candidates in USS(s), K_AL and the minimum number of candidates guaranteed for each AL, K–min_AL may be considered. The minimum number of candidates per AL may be set by higher-layer signaling.

The network/UE may arrange candidates in the order of {the number of overlapping CCEs, a candidate index, a search space index} for each AL, except for K–min_AL candidates.

All candidates for all ALs may be arranged, for example, in the following orders.

Order of highest AL to lowest AL

Order of lowest AL to highest AL

Order based on the number of overlapping CCEs

Order based on the ratio of the number of overlapping CCEs to the number of CCEs in a candidate Order indicated by the network (e.g., 2→4→1→8)

When the number of blind decodings exceeds the blind decoding capability +M, order of lowest AL to highest AL and otherwise, order of highest AL to lowest AL.

The candidates may be arranged in this order and step 3 of Table 7 may be performed.

<Blind Decoding Capability & Channel Estimation Capability>

Both a blind decoding limit and a channel estimation complexity limit may be applied in NR. The above description has been given mainly of the methods of dropping/selecting a candidate to satisfy a channel estimation complexity limit, when the channel estimation complexity limit is exceeded.

When the number of blind decodings that the UE should perform in a specific slot exceeds the blinding decoding limit for such a reason as overlap between monitoring occasions for a plurality of search space sets in the slot, the above proposed methods may be applied in a similar manner. For example, the above proposed rules of prioritizing CORESETs, search space sets, ALs, and candidates may also be applied in the same manner, when the blind decoding limit is handled.

However, when the number of blind decodings is counted, the condition for regarding a plurality of blind decodings as one blind decoding may be applied more strictly than CCE counting for channel estimation. For example, when candidates occupying the same resources in the same CORESET are related to different information but have the same DCI format size, blind decodings for these candidates may be counted as one blind decoding.

Therefore, a different priority rule from a priority rule for overlapping may be applied for candidate dropping, when the blind decoding limit is exceeded. For example, priorities may be set based on the number of different candidates having the same DCI format size in the same resources. As more candidates have the same DCI format size, a higher priority may be assigned. A lower priority may be applied for candidates to be dropped.

The methods of selecting a candidate to be monitored or dropping a candidate, when a blind decoding limit and a channel estimation limit are exceeded due to overlap between search spaces sets in a specific slot have been proposed above. For this purpose, the methods of setting a priority on a resource unit basis have been proposed.

Now, a method of configuring a search space set for cross-carrier scheduling and non-slot based scheduling will be additionally proposed. Cross-carrier scheduling may refer to scheduling a plurality of carriers in the same search space set. Non-slot based scheduling may refer to occurrence of a plurality of monitoring occasions for a specific search space set in one slot.

FIG. 4 is a diagram illustrating a method of selecting a candidate according to an embodiment of the present disclosure.

Referring to FIG. 4, two search space sets (for USSs) are configured in a specific slot. It is assumed that (AL, number of candidates) of USS set 0 are (8,2), (4,2), (2,2), and (1,2), and (AL, number of candidates) of USS set 1 are (8,2), (4,2), and (2,4).

Arrows denote the order of selecting candidates. The candidates may be selected in a round-robin manner based on search space set indexes, ALs, and/or candidate indexes.

The candidates may be selected until a blind decoding limit and/or a channel estimation limit (e.g., the number of CCEs) is reached in the slot.

FIG. 4(a) illustrates a method of performing as many blind decodings as possible for configured search space sets, and FIG. 4(b) illustrates a method of preferentially performing blind decodings for a higher-priority search space set. In FIG. 4, a number beside each candidate denotes the selection turn of the candidate.

While FIG. 4 illustrates an example for two USSs, FIG. 4 may also be applied to a case when a CSS is included. Alternatively, the network/UE may first select a candidate from a CSS and then select a candidate from a USS in the methods illustrated in FIG. 4.

The above methods are also applicable to cross-carrier scheduling and non-slot based scheduling. How the above proposal is applied to each case will be described below. A method of determining a candidate selection order is proposed below, and candidates are selected in the following order until a blind decoding limit or a channel estimation limit is reached. Further, the following description may be interpreted as a description of prioritization and thus may also be applied to a candidate dropping method. For example, candidates may be dropped reversely to the following order. Additionally, while the following description is given in the context of selecting each candidate in a round-robin manner in the order of search space set index-→AL→candidate index, the priorities and factors determining the priorities (e.g., an overlap degree with another candidate and the number of ALs) may be applied differently.

Cross-Carrier Scheduling

Cross-carrier scheduling may refer to an operation of scheduling a plurality of carriers in one search space set. When cross-carrier scheduling is configured, for example, when a Pcell and an Scell are configured, the UE may derive the indexes of CCEs in a candidate of the Pcell and a candidate of the Scell by a hashing function. Specifically, an offset between CCEs in each candidate is given by a parameter known as nCI in the hashing function. When cross-carrier scheduling is applied, a blind decoding limit and a channel estimation limit may be set based on the number of carriers, and candidates to be monitored or dropped may be selected based on the limits.

To select candidates in cross-carrier scheduling, the following options may be considered.

Option 1) a Candidate of an Scell Associated with a Selected Candidate of a Pcell is Automatically Selected.

For example, when candidate #0 of AL 8 in the Pcell is selected, candidate #0 of AL8 in the Scell may also be selected.

Figure 5:
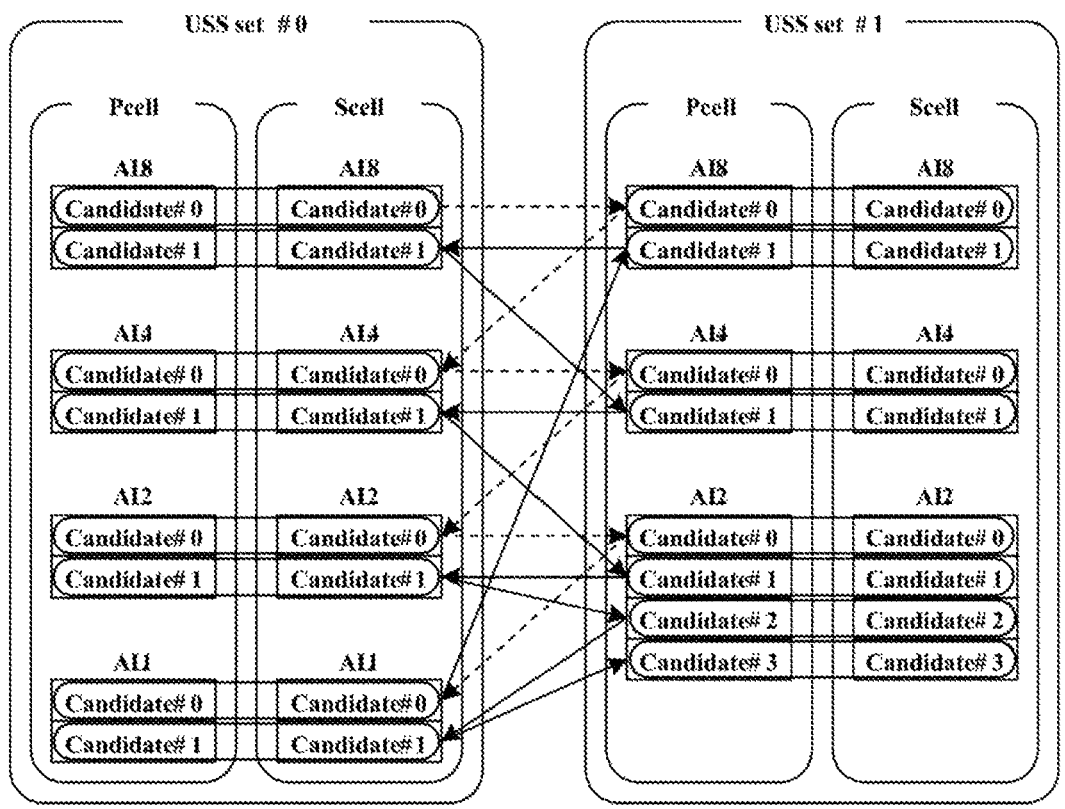
FIG. 5 is a diagram illustrating a method of selecting a candidate according to another embodiment of the present disclosure.

FIG. 5 illustrates an embodiment of option 1. The network/UE may pair candidates having the same index in a Pcell and an Scell and thus select or drop the pair of candidates.

In FIG. 5, pairs of candidates are selected in the same order as illustrated in FIG. 4(a). Despite of simple implementation of the candidate selection method, option 1 may waste resources because two or more candidates are paired and candidates are selected in pairs. For example, when a candidate of AL 8 (e.g., 16 CCEs per pair) is to be selected currently and 10 CCEs are still available before the channel estimation limit is reached, the network/UE may neither select the candidate and nor use the budget of 10 CCEs Option 2) Cell Selection Based on Cell Priority (e.g., Cell Index)

When cross-carrier scheduling is configured, a cell index as well as the above-proposed search space set index, AL, and candidate index may be used as a criterion for candidate selection. In this case, it may be preferable to select candidates not on a pair basis but on an individual candidate basis.

Regarding the above search space set index, AL, and candidate index, the network/UE may select candidates, for example, in the order of search space set index→AL→candidate index. For example, the network/UE selects a specific one of the candidates of a specific AL in a specific search space set, and then selects a candidate of a highest priority in a higher-priority search space set among other unselected search space sets. The network/UE repeats this operation. Higher or lower priorities may be set based on cell indexes proposed in option 2 (e.g., Pcell→Scell0→Scell1→ . . . ) than based on search space set indexes. When priorities based on cell indexes are higher than priorities based on search space set indexes, for example, the network/UE may perform the operation of FIG. 4 for the Pcell. When priorities based on cell indexes are lower than priorities based on search space set indexes (higher than AL-based priorities), the network/UE may first select the Pcell candidate of a pair, while maintaining the order of pairs in FIG. 5. In this case, because candidates are selected with a smaller granularity than in option 1, resource waste is reduced, and as many blind decoding occasions and/or channel estimation occasions as possible are provided.

To reduce resource waste, the foregoing proposed methods may be used. For example, when an allowed blind decoding and/or channel estimation capability is equal to or less than a predetermined level, a candidate requiring a large blind decoding and/or channel estimation complexity beyond the remaining capability may be skipped, whereas a candidate of a highest priority may be selected from among candidates requiring a complexity less than the remaining capability.

Non-Slot Based Scheduling

Similar methods to those used for cross-carrier scheduling may be used for non-slot based scheduling. Non-slot based scheduling refers to configuring multiple monitoring occasions for a specific search space set in one slot. In this case, the increase of the blind decoding and channel estimation complexities is similar to a phenomenon caused by the increase of cells to be monitored in cross carrier scheduling. However, the channel estimation complexity (e.g., the number of CCEs) may be increased significantly in non-slot based scheduling due to the increase of blind decodings by different monitoring occasions, compared to cross carrier scheduling.

Although cell indexes may be used as one of factors determining priorities in cross-carrier scheduling, monitoring occasions (or the time-domain order of monitoring occasions) may be considered as a factor determining priorities in cross-carrier scheduling.

Further, similarly to cross-carrier scheduling, the network/UE may pair candidates having the same indexes in different monitoring occasions of the same search space set, and select candidates to be blind-decoded in a pairwise manner or select a candidate from a pair according to a monitoring occasion order.

Figure 6:
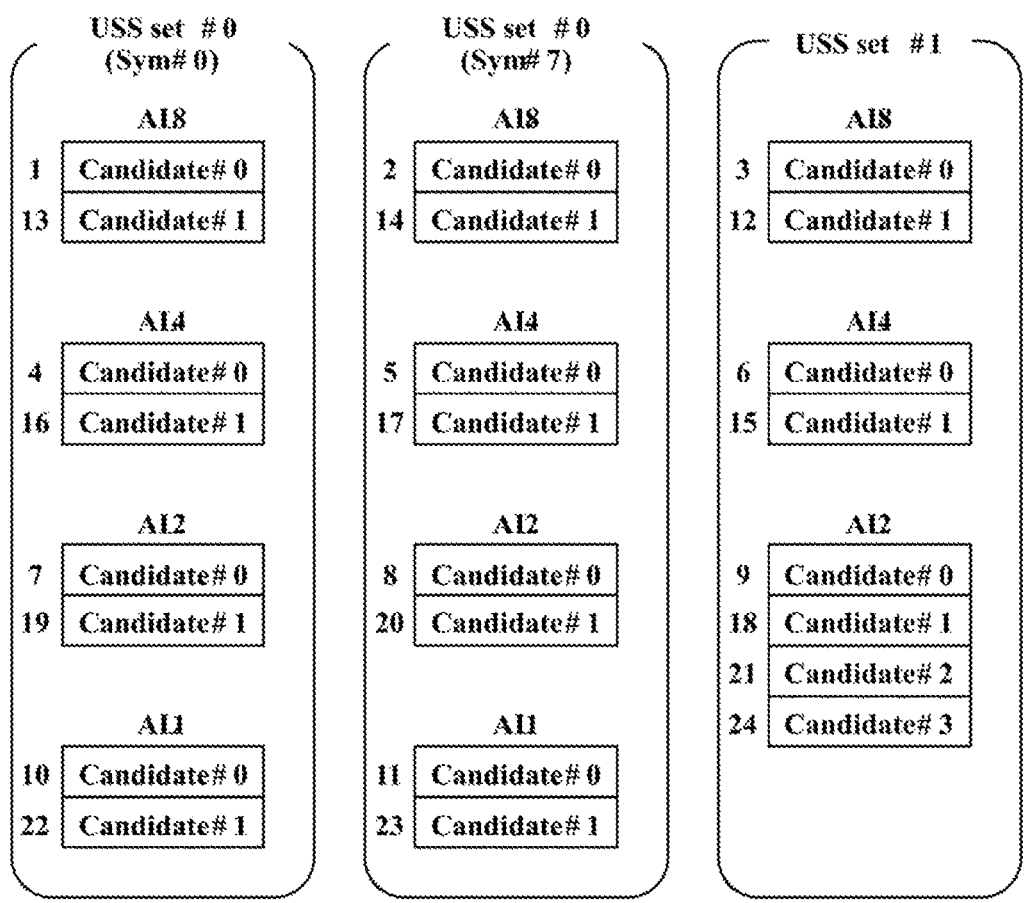
FIG. 6 is a diagram illustrating a method of selecting a candidate according to another embodiment of the present disclosure.

FIG. 6 illustrates a candidate selection method according to an embodiment of the present disclosure.

For example, it is assumed that search space set #0 (e.g., two monitoring occasions in a slot→the starts of CORESETs: Sym#0 and Sym#7) and search space set #1 (e.g., one monitoring occasion in the slot) are configured in the same slot, and the ALs and the number of candidates of each search space set are given as illustrated in FIG. 4. In this case, candidates may be selected as illustrated in FIG. 6. A number beside a candidate denotes the selection turn of the candidate.

Summary

For an LTE PDCCH, channel estimation is performed on a CRS. Therefore, wideband channel estimation may be performed on the CRS, without the need for channel estimation on a CCE basis. On the other hand, in the NR system, a DMRS and an REG bundle are used for channel estimation, and the number of channel estimations rapidly increases, compared to the LTE PDCCH. Therefore, the UE may not perform channel estimation in time in some cases. A channel estimation capability may be defined on an SCS basis, and the priorities of search space types may be defined for PDCCH candidate mapping.

Exceptional Case of PDCCH Candidate Mapping

When a PDCCH decoding candidate has a CCE at least partially overlapping with an SSB, the UE is not required to monitor a PDCCH in the PDCCH decoding candidate. In this regard, there is a need for clearly defining whether candidates including REG(s) overlapping with an SSB are mapped to a search space set.

For example, when the PDCCH decoding candidate partially/fully overlaps with the SSB, the UE does not select the PDCCH decoding candidate as a candidate to be monitored. In other words, when the candidate has resources overlapping with the SSB, the candidate does not affect the blind decoding and channel estimation capability. When the resources overlapping with the SSB are actually selected as a candidate and are not monitored by the UE, this may reduce the number of blind decodings and may not be preferable in terms of efficiency. For a clear and efficient operation, the following is proposed.

Proposal 1: A PDCCH candidate having a CCE at least partially overlapping with a configured SSB is not mapped to a corresponding search space set.

PDCCH Candidate Mapping Rule

When PDCCH candidates are mapped to a search space set in a slot, a CSS has priority over a USS. Because each RNTI monitored in the CSS has its own monitoring periodicity and occasions, multiple CSS sets may be monitored in the same slot, which may cause blind decodings and CCEs beyond the limits. To solve this problem, the following options may be considered: option i) a rule of prioritizing CSS sets is defined (e.g., the priorities of the CSS sets are determined based on RNTIs, CSS types, and/or search space set indexes), and option ii) it is assumed that the number of blind decodings and the number of CCEs are always less than the limits for CSS sets in a slot. Option ii) is simpler than option i).

Proposal 2: At least for CSSs, the UE does not expect that more candidates and/or more non-overlapped CCEs than corresponding limits are configured in a slot.

For example, it is assumed that X, Y, $X_{CSS}$, and $Y_{CSS}$ represent a blind decoding limit, a channel estimation limit, the number of blind decodings for a CSS set, and the number of CCEs for the CSS set, respectively. It is assumed that $X_{USS}(=X-X_{CSS})$ and $Y_{USS}(=Y-Y_{CSS})$ represent a blind decoding limit and a limit for the number of CCEs for a USS set in a slot.

If each of $X_{USS}$ and $Y_{USS}$ is larger than 0 for the USS set, the UE may select candidates for PDCCH monitoring in the USS set until the blind decoding limit or the CCE limit is reached. For candidate selection, the following round-robin scheme may be selected.

To provide equal occasions and scheduling flexibility for different search space sets and ALs, candidates may be selected in a round-robin manner based on search space set indexes, ALs, and candidate indexes. For example, if (AL, number of candidates)={(8,2), (4,2), (2,2), (1,2)} for USS #0 and USS #1, the UE may select candidates one by one in the following order until the limits are reached: (search space set index, AL, candidate index)=(0, 8, 0), (1, 8, 0), (0, 4, 0), (1, 4, 0), (0, 2, 0), (1, 2, 0), (0, 1, 0), (1, 1, 0), (0, 8, 1), (1, 8, 1), and (1, 1, 1).

In other words, PDCCH candidates may be mapped to USS sets in the round-robin manner in the following rule until the limit (i.e., $X_{USS}$ or $Y_{USS}$) is reached. (1) A low search space set index may have priority over a high search space set index, (2) a high AL may have priority over a low AL, and (3) a low candidate index may have priority over a high candidate index.

In another method, round-robin selection may be applied to the ALs and candidate indexes of a search space set (e.g., a higher-priority search space set). When each of $X_{USS}$ and $Y_{USS}$ is larger than 0, candidates of other USS sets may be selected.

When search space set #0 has a higher priority in the above example, the UE may select candidates as follows: (search space set index, AL, candidate index)=(0, 8, 0), (0, 4, 0), (0, 2, 0), (0, 1, 0), (0, 8, 1), (0, 4, 1), (0, 2, 1), (0, 1, 1), (1, 8, 0), (1, 4, 0), and (1, 1, 1)

As described above, FIG. 4 illustrates an example of mapping candidates in a round-robin manner.

Proposal 3: PDCCH candidates may be mapped to USS sets in the following rule until a blind decoding limit or a CCE limit is reached. Candidates may be selected in a round-robin manner based on search space indexes, ALs, and/or candidate indexes. A search space set and candidate with lower indexes may be selected preferentially. A higher AL may be selected preferentially.

Additional Selection of Candidates

If blind decoding may further be performed even after the channel estimation limit is reached, candidates may be additionally selected to provide more PDCCH reception occasions. In this case, because the UE is not capable of additional channel estimation, the UE may select additional candidates only when the candidates fully overlap with CCEs already selected from a CORESET. These additional candidates do not increase the number of CCEs for channel estimation.

Proposal 4: For scheduling flexibility, blind decoding and channel estimation performance may be fully used.

Proposal 5: If a blind decoding may further be performed without an additional channel estimation, candidates that do not increase channel estimations may be mapped to a search space set.

Figure 7:
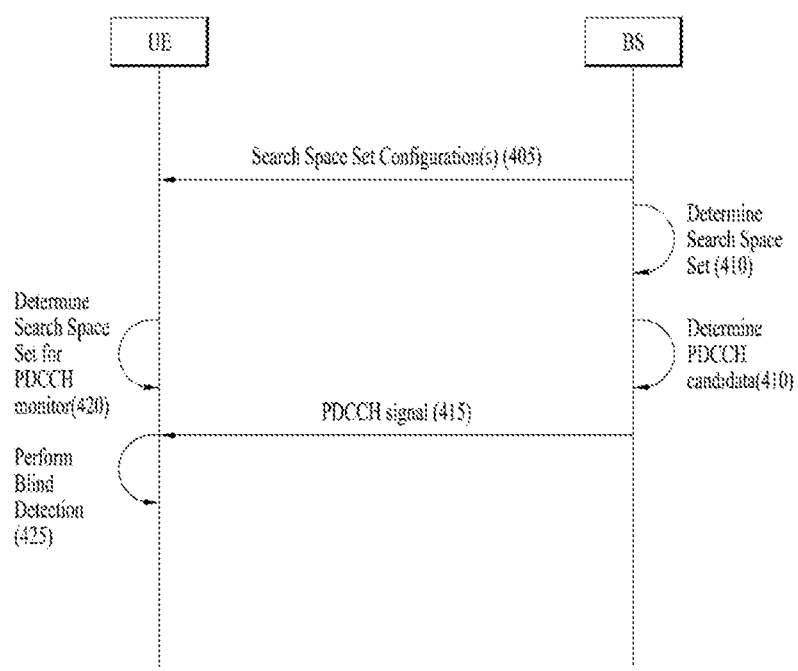
FIG. 7 is a diagram illustrating a signal flow for a method of transmitting and receiving a PDCCH signal according to an embodiment of the present disclosure.

FIG. 7 is a diagram illustrating a signal flow for a method of transmitting and receiving a PDCCH signal according to an embodiment of the present disclosure. FIG. 7 illustrates exemplary implementation of the foregoing description, not limiting the present disclosure. A redundant description with the foregoing description will not be provided herein.

Referring to FIG. 7, a BS transmits configurations for a plurality of search space sets to a UE (405). As described before, the configuration of each search space set may include information about a PDCCH monitoring periodicity, the number of candidates for each AL, and an SS type (e.g., CSS/USS).

The BS may determine, based on the monitoring periodicity for each of the plurality of search space sets, search space sets for which the UE should monitor the PDCCH signal for a specific unit time (e.g., a specific slot) (410). In a similar manner, the UE may determine, based on the monitoring periodicity for each of the plurality of search space sets, search space sets for which the UE should monitor the PDCCH signal for a specific unit time (e.g., a specific slot) (420).

The BS may determine a PDCCH candidate for transmitting the PDCCH signal to the UE (410). Specifically, the BS identifies PDCCH candidates that the UE may monitor for a specific unit time. Then, the BS may select at least one of the PDCCH candidates that the UE may monitor, for the PDCCH signal transmission. When the number of PDCCH candidates and the number of CCEs included in the previously determined search space sets exceed the maximum number of candidates or the maximum number of CCEs that may be monitored by the UE, the BS may determine that only a part of the PDCCH candidates included in the determined search space sets may be monitored by the UE. In this connection, the BS assumes that the UE firstly monitors PDCCH candidates in a first search space set related to a CSS. Thus, the BS may determine PDCCH candidates for which the UE may monitor.

The BS selects PDCCH candidates may be monitored by the UE from the first search space set. Thereafter, the BS may determine additional PDCCH candidates that may be monitored by the UE until reaching the maximum number of the candidates, or until reaching the maximum number of CCEs, in a second search space set corresponding to a UE-specific search space (US S). The BS may determine the second search space set based on the search space set index.

The determined search space sets may include the first search space set and a plurality of second search space sets corresponding to the USS. The BS may assign a higher priority to a search space set having a lower search space set index among the second search space sets.

The BS may map the PDCCH signal to the selected PDCCH candidate and transmit the PDCCH signal (415).

The UE may perform blind-detection to receive the PDCCH signal (425). When the number of PDCCH candidates and the number of control channel elements (CCEs) included in the determined search space sets exceed the maximum number of the candidates or the maximum number of the CCEs respectively, the UE may attempt to selectively blind-detect only a part of the PDCCH candidates included in the determined search space sets. In the selection of PDCCH candidates for the blind-detection by the UE, the UE may firstly select PDCCH candidates from a first search space set related to a CSS among the determined search space sets.

After the UE selects the PDCCH candidates from the first search space set, the UE may select additional PDCCH candidates for the blind-detection until reaching the maximum number of the candidates or until reaching the maximum number of CCEs, from a second search space set corresponding to the UE-specific search space (USS). In one example, the UE may determine the second search space set based on a search space set index.

The search space sets determined by the UE may include the first search space set and a plurality of the second search space sets corresponding to the UE specific search space (USS). The UE may assign a higher priority to a search space set having a lower search space set index among the second search space sets related to the USS.

The maximum number of candidates and the maximum number of CCEs may be values determined based on an SCS.

The maximum number of candidates may be related to the maximum number of blind-decoding by the UE. The maximum number of CCEs may be related to the maximum channel estimation capability of the UE.

The number of CCEs included in the determined search space sets may be the number of CCEs that do not overlap with each other.

Figure 8:
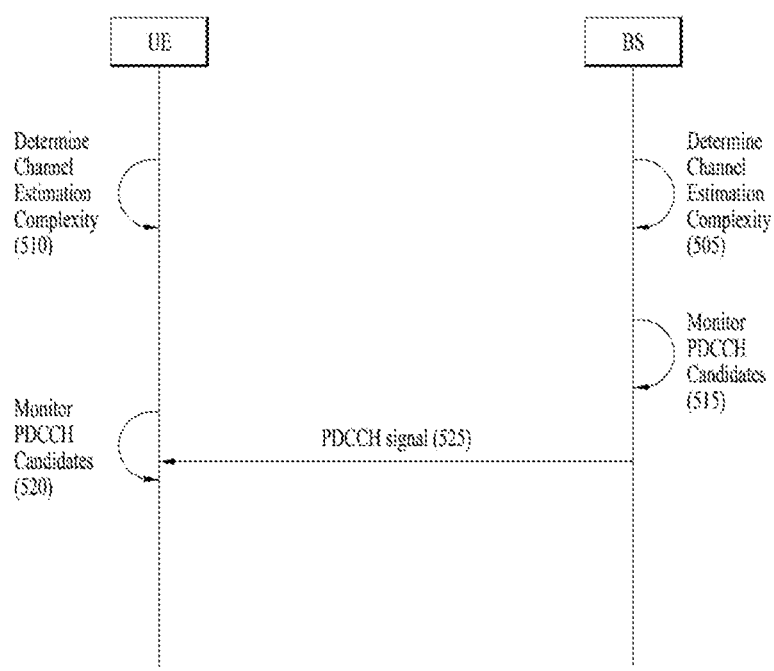
FIG. 8 is a diagram illustrating a signal flow for a method of transmitting and receiving a PDCCH signal according to an embodiment of the present disclosure.

FIG. 8 is a diagram illustrating a signal flow for a method of transmitting and receiving a PDCCH signal according to an embodiment of the present disclosure. FIG. 8 illustrates exemplary implementation of the foregoing description, not limiting the present disclosure. A redundant description with the foregoing description will not be provided herein.

The embodiment of FIG. 8 is not necessarily implemented separately from the embodiment of FIG. 7. For example, FIG. 8 may be understood as more specific implementation of the method of calculating the channel estimation capability (e.g., the number of CCEs) of the UE in the PDCCH transmission and reception method of FIG. 7.

Referring to FIG. 8, a BS determines a channel estimation complexity required for a UE to monitor PDCCH candidates in at least one CORESET during one slot (505). For example, the channel estimation complexity may be determined based on an REG bundle size configured for each of the at least one CORESET.

When the determined channel estimation complexity exceeds a channel estimation capability of the UE, the BS may determine some PDCCH candidates for which the UE skips monitoring and the remaining PDCCH candidates that the UE monitors among the PDCCH candidates (515).

The BS may transmit a PDCCH signal based on one of the remaining PDCCH candidates (525).

Before receiving the PDCCH signal, the UE may perform a detection process for PDCCH reception as follows.

The UE determines the channel estimation complexity required to monitor PDCCH candidates in at least one CORESET during one slot (510). For example, the channel estimation complexity may be determined based on an REG bundle size configured for each of the at least one CORESET.

When the determined channel estimation complexity exceeds the channel estimation capability of the UE, the UE skips monitoring of some PDCCH candidates and monitors only the remaining PDCCH candidates among the PDCCH candidates (520).

The UE receives the PDCCH signal based on a result of monitoring the remaining PDCCH candidates (525).

For example, the channel estimation complexity may be represented as the number of CCEs. The UE or the BS may calculate the number of CCEs by applying a weight associated with the REG bundle size.

For example, the UE or the BS may determine different channel estimation complexities based on whether a wideband RS has been configured in each of the at least one CORESET. For a CORESET configured with a wideband RS, the UE or the BS may determine a channel estimation complexity based on at least one of the number of symbols or the number of RBs in the CORESET. For the CORESET configured with a wideband RS, the UE or the BS may determine the channel estimation complexity by applying a weight associated with DFT-based channel estimation. For a CORESET configured without a wideband RS, the UE or the BS may determine a channel estimation complexity by applying a weight associated with MMSE-based channel estimation.

Figure 9:
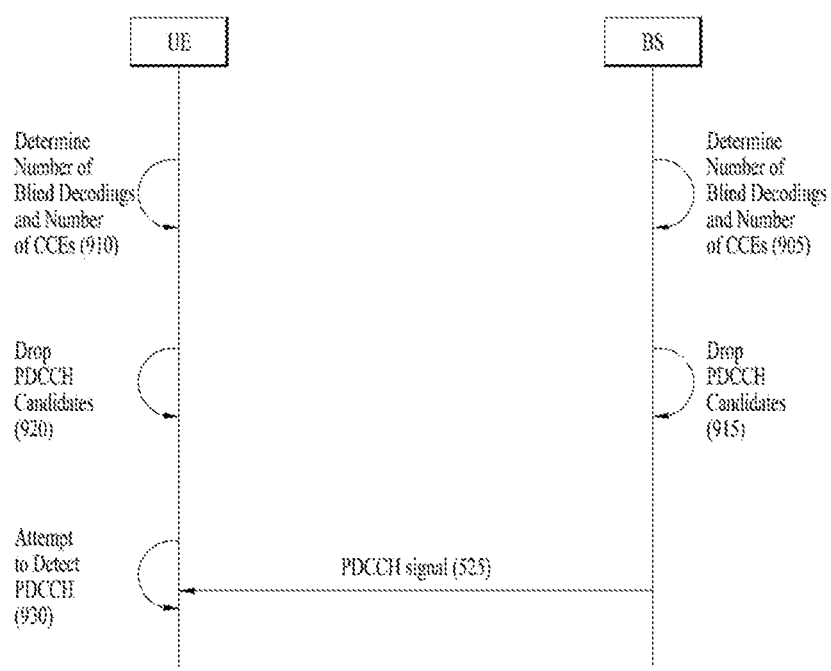
FIG. 9 is a diagram illustrating a signal flow for a method of transmitting and receiving a PDCCH signal according to another embodiment of the present disclosure.

FIG. 9 is a diagram illustrating a signal flow for a method of transmitting and receiving a PDCCH signal according to another embodiment of the present disclosure. A redundant description with the foregoing description will not be provided herein.

A BS determines the number of blind decodings and the number of CCEs for channel estimation which are related to a plurality of search space sets that the UE should monitor during one slot (905).

When the determined number of blind decodings exceeds a blind decoding limit or when the determined number of CCEs exceeds a channel estimation limit, the BS drops at least one of PDCCH candidates included in the plurality of search space sets (915). The BS may drop the at least one PDCCH candidate from the plurality of search space sets in a round-robin manner until both of the blind decoding limit and the channel estimation limit are satisfied.

The BS transmits a PDCCH signal based on the remaining non-dropped PDCCH candidates among the PDCCH candidates (925).

A UE determines the number of blind decodings and the number of CCEs for channel estimation which are related to the plurality of search space sets that the UE should monitor during one slot (910).

When the determined number of blind decodings exceeds the blind decoding limit or when the determined number of CCEs exceeds the channel estimation limit, the UE drops at least one of the PDCCH candidates included in the plurality of search space sets (920). The UE may drop the at least one PDCCH candidate from the plurality of search space sets in the round-robin manner until both of the blind decoding limit and the channel estimation limit are satisfied.

The UE attempts to detect the PDCCH signal based in the remaining non-dropped PDCCH candidates among the PDCCH candidates (930).

The UE/BS may drop a PDCCH candidate in a descending order of ALs in each search space set.

Each search space set may satisfy a nested structure in which a PDCCH candidate is included in another PDCCH candidate of a higher AL than that of the PDCCH candidate.

Each search space set may include a default PDCCH candidate which is not allowed to be dropped, and the UE may determine the default PDCCH candidate based on at least one of a PDCCH candidate index or a UE ID.

The UE may be configured to attempt to detect both a PDCCH signal in a first cell and a PDCCH signal in a second cell in the same search space set.

PDCCH candidates in the first cell and PDCCH candidates in the second cell may be paired in the same search space set, and the UE/BS may determine whether to drop PDCCH candidates in pairs.

The UE/BS may determine which one of the PDCCH candidate in the first cell and the PDCCH candidate in the second cell in the same search space set is to be dropped, based on a cell index.

Figure 10:
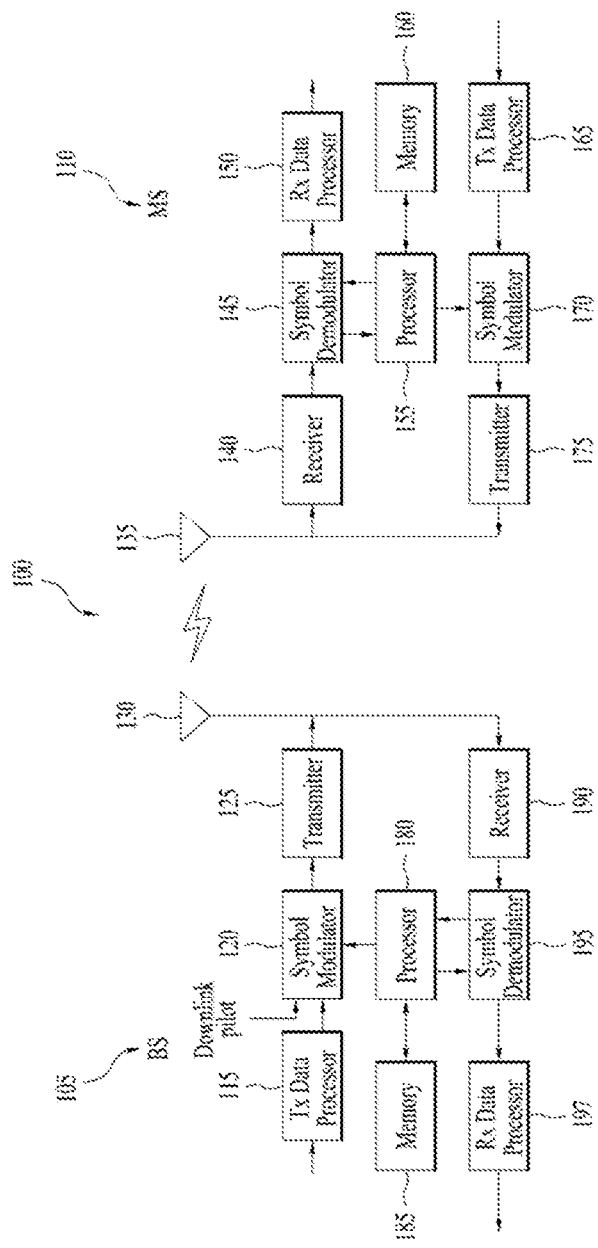
FIG. 10 is a block diagram of a UE and a base station (BS) according to an embodiment of the present disclosure.

FIG. 10 is a block diagram illustrating a structure of a BS 105 and a UE 110 in a wireless communication system 100 according to an embodiment of the present disclosure. The structure of the BS 105 and the UE 110 of FIG. 10 are merely an embodiment of a BS and a UE for implementing the aforementioned method and the structure of a BS and a UE according to the present disclosure is not limited to FIG. 10. The BS 105 may also be referred to as an eNB or a gNB. The UE 110 may also be referred to as a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present disclosure support a Multiple Input Multiple Output (MIMO) system. The BS 105 according to the present disclosure may support both a Single User-MIMO (SU-MIMO) scheme and a Multi User-MIMO (MU-MIMO) scheme.

In DL, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a time division multiplexing (TDM) symbol, or a code division multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a DL signal appropriate for data transmission through an RF channel. Subsequently, the DL signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for DL from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in UL, and provides data symbols. The symbol modulator 170 receives and multiplexes data symbols, and modulates the multiplexed data symbols, such that it may provide a stream of symbols to the transmitter 175. The transmitter 175 obtains and processes the stream of symbols to generate an UL (UL) signal, and the UL signal is transmitted to the BS 105 through the antenna 135. The transmitter and the receiver of UE/BS may be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via UL. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it may store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present disclosure may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In one example, the processor of the UE receives configurations for a plurality of search space sets from a BS via a receiver of the UE. The processor determines search space sets for which the UE should monitor the PDCCH signal for a specific unit time, based on the monitoring periodicity of each of the plurality of search space sets. When the number of PDCCH candidates and the number of control channel elements (CCEs) included in the determined search space sets exceed the maximum number of candidates or the maximum number of CCEs, respectively, the processor may attempt to blind-detect selectively only a part of the PDCCH candidates included in the determined search space sets. In selection of PDCCH candidates for the blind-detection by the processor of the UE, the processor may firstly select PDCCH candidates from a first search space set related to a CSS among the determined search space sets.

In one example, while the processor of the BS assumes that the UE preferentially monitors PDCCH candidates from the first search space set corresponding to the CSS among the determined search space sets, the processor of the BS may determine PDCCH candidates that may be monitored by the UE. The processor of the BS may determine, based on the monitoring periodicity for each of the plurality of search space sets, search space sets for which the UE should monitor the PDCCH signal for a specific unit time (e.g., a specific slot). When the number of PDCCH candidates and the number of CCEs included in the previously determined search space sets exceed the maximum number of candidates or the maximum number of CCEs that may be monitored by the UE, the processor of the BS may determine that only a part of the PDCCH candidates included in the determined search space sets may be monitored by the UE. The processor of the BS selects at least one of PDCCH candidates may be monitored by the UE and transmit the PDCCH signal to the UE via the selected at least one. The processor of the BS may determine PDCCH candidates may be monitored by the UE under assumption that the UE may first select PDCCH candidates from a first search space set related to a CSS among the previously determined search space sets.

In a firmware or software configuration, methods according to the embodiments of the present disclosure may be implemented in the form of modules, procedures, functions, etc. which perform the above-described functions or operations. Firmware or software implemented in the present disclosure may be contained in the processor 155 or 180 or the memory unit 160 or 185, such that it may be driven by the processor 155 or 180.

Radio interface protocol layers among the UE 110, the BS 105, and a wireless communication system (i.e., network) may be classified into a first layer (L1 layer), a second layer (L2 layer) and a third layer (L3 layer) on the basis of the lower three layers of the open system interconnection (OSI) reference model widely known in communication systems. A physical layer belonging to the first layer (L1) provides an information transfer service through a physical channel. A radio resource control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present disclosure in prescribed forms. And, it is able to consider that the respective elements or features are selective unless they are explicitly mentioned. Each of the elements or features may be implemented in a form failing to be combined with other elements or features. Moreover, it is able to implement an embodiment of the present disclosure by combining elements and/or features together in part. A sequence of operations explained for each embodiment of the present disclosure may be modified. Some configurations or features of one embodiment may be included in another embodiment or may be substituted for corresponding configurations or features of another embodiment. And, it is apparently understandable that an embodiment is configured by combining claims failing to have relation of explicit citation in the appended claims together or may be included as new claims by amendment after filing an application.

While the present disclosure has been described and illustrated herein with reference to the preferred embodiments thereof, it will be apparent to those skilled in the art that various modifications and variations may be made therein without departing from the spirit and scope of the invention. Thus, it is intended that the present disclosure covers the modifications and variations of this invention that come within the scope of the appended claims and their equivalents.

INDUSTRIAL APPLICABILITY

As described above, the present disclosure may be applied to various wireless communication systems.

The invention claimed is:

1. A method of receiving a physical downlink control channel (PDCCH) signal by a user equipment (UE) in a wireless communication system, the method comprising:
    determining the number of blind decodings and the number of control channel elements (CCEs) for channel estimation, related to a plurality of search space sets to be monitored during one slot by the UE;
    based on that the determined number of blind decodings exceeds a blind decoding limit or the determined number of CCEs exceeds a channel estimation limit, dropping at least one of PDCCH candidates included in the plurality of search space sets; and
    attempting to detect a PDCCH signal based on remaining non-dropped PDCCH candidates among the PDCCH candidates,
    wherein the UE drops the at least one PDCCH candidate from the plurality of search space sets in a round-robin manner until both the blind decoding limit and the channel estimation limit are satisfied.

2. The method according to claim 1, wherein the UE drops a PDCCH candidate in a descending order of aggregation levels in each search space set.

3. The method according to claim 2, wherein the search space set satisfies a nested structure in which a PDCCH candidate is included in a PDCCH candidate of a higher aggregation level than an aggregation level of the PDCCH candidate.

4. The method according to claim 1, wherein each search space set includes a default PDCCH candidate which is not allowed to be dropped, and
    wherein the UE determines the default PDCCH based on at least one of a PDCCH candidate index or a UE identifier (ID).

5. The method according to claim 1, wherein the UE attempts to detect both a PDCCH signal in a first cell and a PDCCH signal in a second cell in the same search space set.

6. The method according to claim 5, wherein PDCCH candidates in the first cell are paired with PDCCH candidates in the second cell in the same search space set, and
    wherein the UE determines whether to drop PDCCH candidates on a pair basis.

7. The method according to claim 5, wherein the UE determines which one of the PDCCH candidate in the first cell and the PDCCH candidate in the second cell is to be dropped based on cell indexes in the same search space set.

8. A method of transmitting a physical downlink control channel (PDCCH) signal by a base station (BS) in a wireless communication system, the method comprising:
    determining the number of blind decodings and the number of control channel elements (CCEs) for channel estimation, related to a plurality of search space sets to be monitored during one slot by a user equipment (UE);
    based on that the determined number of blind decodings exceeds a blind decoding limit or the determined number of CCEs exceeds a channel estimation limit, dropping at least one of PDCCH candidates included in the plurality of search space sets; and
    transmitting a PDCCH signal based on remaining PDCCH non-dropped candidates among the PDCCH candidates,
    wherein the BS drops the at least one PDCCH candidate from the plurality of search space sets in a round-robin manner until both the blind decoding limit and the channel estimation limit are satisfied.

9. The method according to claim 8, wherein the BS drops a PDCCH candidate in a descending order of aggregation levels in each search space set.

10. The method according to claim 9, wherein the search space set satisfies a nested structure in which a PDCCH candidate is included in a PDCCH candidate of a higher aggregation level than an aggregation level of the PDCCH candidate.

11. The method according to claim 8, wherein each search space set includes a default PDCCH candidate which is not allowed to be dropped, and
wherein the BS determines the default PDCCH based on at least one of a PDCCH candidate index or a UE identifier (ID).

12. The method according to claim 8, wherein the BS configures the UE to attempt to detect both a PDCCH signal in a first cell and a PDCCH signal in a second cell in the same search space set.

13. The method according to claim 12, wherein PDCCH candidates in the first cell are paired with PDCCH candidates in the second cell in the same search space set, and
wherein the BS determines whether to drop PDCCH candidates on a pair basis.

14. The method according to claim 12, wherein the BS determines which one of the PDCCH candidate in the first cell and the PDCCH candidate in the second cell is to be dropped based on cell indexes in the same search space set.

15. A user equipment (UE) for receiving a physical downlink control channel (PDCCH) signal in a wireless communication system, the UE comprising:
a transceiver; and
a processor configured to determine the number of blind decodings and the number of control channel elements (CCEs) for channel estimation, related to a plurality of search space sets to be monitored during one slot by the UE, drop at least one of PDCCH candidates included in the plurality of search space sets, based on that the determined number of blind decodings exceeds a blind decoding limit or the determined number of CCEs exceeds a channel estimation limit, and attempt to detect a PDCCH signal based on remaining non-dropped PDCCH candidates among the PDCCH candidates,
wherein the processor is configured to drop the at least one PDCCH candidate from the plurality of search space sets in a round-robin manner until both the blind decoding limit and the channel estimation limit are satisfied.

16. The UE according to claim 15, wherein the UE is capable of communicating with at least one of another UE, a UE related to an autonomous driving vehicle, a base station or a network.

* * * * *